US012812087B2

(12) United States Patent
Lee et al.

(10) Patent No.: US 12,812,087 B2
(45) Date of Patent: Nov. 24, 2026

(54) IMAGE ENCODING/DECODING METHOD AND DEVICE, AND RECORDING MEDIUM STORING BITSTREAM USING INTERC-COMPONENT PREDICTION

(71) Applicant: ELECTRONICS AND TELECOMMUNICATIONS RESEARCH INSTITUTE, Daejeon (KR)

(72) Inventors: Jin Ho Lee, Daejeon (KR); Jung Won Kang, Daejeon (KR); Ha Hyun Lee, Daejeon (KR); Sung Chang Lim, Daejeon (KR); Hui Yong Kim, Daejeon (KR)

(73) Assignee: ELECTRONICS and TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/951,139

(22) Filed: Nov. 18, 2024

(65) Prior Publication Data

US 2025/0080723 A1 Mar. 6, 2025

Related U.S. Application Data

(63) Continuation of application No. 17/436,989, filed as application No. PCT/KR2020/003206 on Mar. 6, 2020, now abandoned.

(30) Foreign Application Priority Data

Mar. 8, 2019 (KR) ........................ 10-2019-0027149

(51) Int. Cl.
*H04N 19/105* (2014.01)
*H04N 19/11* (2014.01)
(Continued)

(52) U.S. Cl.
CPC ........... *H04N 19/105* (2014.11); *H04N 19/11* (2014.11); *H04N 19/119* (2014.11);
(Continued)

(58) Field of Classification Search
CPC .... H04N 19/105; H04N 19/11; H04N 19/119; H04N 19/174; H04N 19/176;
(Continued)

(56) References Cited

U.S. PATENT DOCUMENTS 9,854,250 B2 12/2017 Kim et al.
2013/0170546 A1* 7/2013 Kim ....................... H04N 19/50 375/240.12

(Continued)

FOREIGN PATENT DOCUMENTS

EP 2719183 B1 1/2019
KR 101483495 B1 1/2015

(Continued)

OTHER PUBLICATIONS

De-Luxán-Hernández et al., "CE3:Intra Sub-Partitions Coding Mode(Tests 1.1.1 and 1.1.2)", Joint Video Experts Team(JVET) of ITU-T SG 16 WP 3 and ISO/IEC JTC 1/SC 29/WG 11, JVET-M0102_v5, Jan. 9-18, 2019, pp. 1-9.

(Continued)

*Primary Examiner* — Marnie A Matt
(74) *Attorney, Agent, or Firm* — Sughrue Mion, PLLC

(57) ABSTRACT

Provided are an image encoding/decoding method and device. An image decoding method according to the present invention comprises the steps of: determining an intra prediction mode of a current block; and generating a prediction block of the current block by performing prediction on the basis of the intra prediction mode of the current block. An intra prediction mode for a luminance block of the current block is derived by means of a most probable mode (MPM)

(Continued)

list comprises a plurality of MPM candidates. The MPM list can be constructed independently from as to whether a plurality of reference sample lines are used and whether a divided prediction is performed by means of a sub-block.

12 Claims, 13 Drawing Sheets

(51) Int. Cl.
*H04N 19/119* (2014.01)
*H04N 19/174* (2014.01)
*H04N 19/176* (2014.01)
*H04N 19/186* (2014.01)
*H04N 19/70* (2014.01)

(52) U.S. Cl.
CPC ......... *H04N 19/174* (2014.11); *H04N 19/176* (2014.11); *H04N 19/186* (2014.11); *H04N 19/70* (2014.11)

(58) Field of Classification Search
CPC ...... H04N 19/186; H04N 19/70; H04N 19/61; H04N 19/593; H04N 19/132
USPC ..................................................... 375/240.12
See application file for complete search history.

(56) References Cited

U.S. PATENT DOCUMENTS

| | | | | |
|---|---|---|---|---|
| 2014/0003512 | A1 | 1/2014 | Sato | |
| 2014/0072033 | A1* | 3/2014 | Chuang .................. | H04N 19/82 375/240.02 |
| 2015/0281700 | A1 | 10/2015 | Kim et al. | |
| 2017/0347093 | A1* | 11/2017 | Yu ........................ | H04N 19/593 |
| 2018/0109808 | A1 | 4/2018 | Lim et al. | |
| 2018/0176601 | A1 | 6/2018 | Jeong et al. | |
| 2019/0200011 | A1* | 6/2019 | Yoo ...................... | H04N 19/176 |
| 2019/0238835 | A1* | 8/2019 | Lee ....................... | H04N 19/119 |
| 2019/0379891 | A1* | 12/2019 | Moon .................. | H04N 19/117 |
| 2019/0387222 | A1* | 12/2019 | Kim ..................... | H04N 19/593 |
| 2020/0162728 | A1* | 5/2020 | Van der Auwera .. | H04N 19/423 |
| 2020/0252605 | A1 | 8/2020 | Xu et al. | |
| 2020/0275115 | A1 | 8/2020 | Chiang et al. | |
| 2020/0296417 | A1 | 9/2020 | Ko et al. | |
| 2021/0243429 | A1 | 8/2021 | Lee | |
| 2021/0314595 | A1 | 10/2021 | Zhang et al. | |
| 2022/0086439 | A1 | 3/2022 | Tsai et al. | |

FOREIGN PATENT DOCUMENTS

| | | | |
|---|---|---|---|
| KR | 10-2019-0020625 | A | 3/2019 |
| WO | 2018064956 | A1 | 4/2018 |

OTHER PUBLICATIONS

Bross, et al. “Versatile Video Coding(Draft 5)”, Joint Video Experts Team(JVET) of ITU-T SG 16 WP 3 and ISO/IEC JTC 1/SC 29/WG 11, JVET-N1001-v10, Mar. 19-27, 2019, pp. 1-395 (406 pages total).

Yu, et al. “On MPM determination and Planar mode signaling”, Joint Collaborative Team on Video Coding (JCT-VC) of ITU-T SG16 WP3 and ISO/IEC JTC1/SC29/WG11, JCTVC-H0516-r3, Feb. 1-10, 2012, pp. 1-6.

Chiang, et al. “CE10.1: Combined and multi-hypothesis prediction”, Joint Video Experts Team(JVET) of ITU-T SG 16 WP 3 and ISO/IEC JTC 1/SC 29/WG 11, JVET-K0257-v1, Jul. 10-18, 2018, pp. 1-6.

Chang, et al., “Arbitrary reference tier for intra directional modes”, Joint Video Exploration Team(JVET) of ITU-T SG 16 WP 3 and ISO/IEC JTC 1/SC 29/WG 11, JVET-C0043_r1, May 26-Jun. 1, 2016, pp. 1-5.

Bross et al. “Versatile Video Coding (Draft 4)”, Joint Video Experts Team (JVET) of ITU-T SG 16 WP 3 and ISO/IEC JTC 1/SC 29/WG11, JVET-M1001-v7, 13th Meeting: Marrakech, MA. pp. 1-290, Jan. 18, 2019 (Year: 2019).

Junru Li et al., CE10-related: MPM list alignment between CIIP and intra mode, Joint Video Experts Team (JVET) of ITU-T SG 16 WP 3 and ISO/IEC JTC 1/SC29/WG 11, JVET-M0276, pp. 1-3, Jan. 9-18, 2019, 13th Meeting: Marrakech, MA.

Liang Zhao et al., “CE3-related: MPM based multi-line intra prediction scheme”, Joint Video Exploration Team (JVET) of ITU-T SG 16 WP 3 and ISO/IEC JTC 1/SC 29/WG 11, 2018, 3 pages.

* cited by examiner

IMAGE ENCODING/DECODING METHOD AND DEVICE, AND RECORDING MEDIUM STORING BITSTREAM USING INTERC-COMPONENT PREDICTION

CROSS REFERENCE TO RELATED APPLICATION

This is a Continuation Application of U.S. application Ser. No. 17/436,989 filed Sep. 7, 2021 which is a National Stage of International Application No. PCT/KR2020/003206 filed Mar. 6, 2020, which claims priority from Korean Patent Application No. 10-2019-0027149 filed Mar. 8, 2019. The disclosures of which are incorporated herein by reference in their entireties.

TECHNICAL FIELD

The present invention relates to a method and apparatus for encoding/decoding an image, and a recording medium for storing bitstream. More particularly, the present invention relates to a method and apparatus for encoding/decoding an image using intra prediction between color components.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

DISCLOSURE

Technical Problem

An object of the present invention is to provide an image encoding/decoding method and apparatus with improved encoding/decoding efficiency.

Another object of the present invention is to provide an image encoding/decoding method and apparatus with increased entropy coding efficiency, by using intra prediction between color components.

Another object of the present invention is to provide a recording medium for storing a bitstream generated by an image decoding method or apparatus according to the present invention.

Technical Solution

A method of decoding an image according to an embodiment of the present invention includes determining an intra-prediction mode of a current block and generating a prediction block of the current block by performing prediction based on the intra-prediction mode of the current block, wherein an intra-prediction mode for a luma block of the current block is derived by using an MPM list comprising a multiplicity of MPM (Most Probable Mode) candidates, and wherein the MPM list is constructed independently of whether or not a multiplicity of reference sample lines is used and whether or not partition prediction through a sub-block is performed.

In the image decoding method, wherein the MPM list does not comprise a Planar mode.

In the image decoding method, wherein the MPM list comprises five MPM candidates.

In the image decoding method, wherein an intra-prediction mode for a chroma block of the current block is determined based on whether or not intra prediction between color components can be performed for the current block.

In the image decoding method, wherein the whether or not intra prediction between color components can be performed for the current block is determined based on a coding parameter for the current block.

In the image decoding method, wherein the coding parameter for the current block comprises at least one of a slice type comprising the current block and information on whether or not the current block is a block that is dual-tree partitioned.

In the image decoding method, wherein, when intra prediction between color components may be performed for the current block, based on information on whether or not intra prediction between color components is applied to the current block, an intra-prediction mode for a chroma block of the current block is determined.

In the image decoding method, wherein, when CIIP (Combined Inter and Intra Prediction) is applied to the current block, an intra-prediction mode of the current block is determined as a predetermined mode.

In the image decoding method, wherein the predetermined mode is a Planar mode.

A method of encoding an image according to an embodiment of the present invention includes determining an intra-prediction mode of a current block and generating a prediction block of the current block by performing prediction based on the intra-prediction mode of the current block, wherein an intra-prediction mode for a luma block of the current block is derived by using an MPM list comprising a multiplicity of MPM (Most Probable Mode) candidates, and wherein the MPM list is constructed independently of whether or not a multiplicity of reference sample lines is used and whether or not partition prediction through a sub-block is performed.

In the image encoding method, wherein the MPM list does not comprise a Planar mode.

In the image encoding method, wherein the MPM list comprises five MPM candidates.

In the image encoding method, wherein an intra-prediction mode for a chroma block of the current block is determined based on whether or not intra prediction between color components can be performed for the current block.

In the image encoding method, wherein the whether or not intra prediction between color components can be performed for the current block is determined based on a coding parameter for the current block.

In the image encoding method, wherein the coding parameter for the current block comprises at least one of a slice type comprising the current block and information on whether or not the current block is a block that is dual-tree partitioned.

In the image encoding method, when prediction between color components can be performed for the current block, further comprising judging whether or not prediction between color components is applied to the current block and encoding information on whether or not prediction between color components is applied to the current block.

In the image encoding method, wherein, when CIIP (Combined Inter and Intra Prediction) is applied to the current block, an intra-prediction mode of the current block is determined as a predetermined mode.

In the image encoding method, wherein the predetermined mode is a Planar mode.

In a non-transitory computer-readable recording medium for storing a bitstream generated by a method of encoding an image according to an embodiment of the present invention, the method includes determining an intra-prediction mode of a current block and generating a prediction block of the current block by performing prediction based on the intra-prediction mode of the current block, wherein an intra-prediction mode for a luma block of the current block is derived by using an MPM list comprising a multiplicity of MPM (Most Probable Mode) candidates, and wherein the MPM list is constructed independently of whether or not a multiplicity of reference sample lines is used and whether or not partition prediction through a sub-block is performed.

Advantageous Effects

According to the present invention, it is possible to provide an image encoding/decoding method and apparatus with improved encoding/decoding efficiency.

According to the present invention, it is possible to provide an image encoding/decoding method and apparatus with increased entropy coding efficiency, by using intra prediction between color components.

According to the present invention, it is possible to provide a recording medium for storing a bitstream generated by an image encoding method or apparatus according to the present invention.

According to the present invention, it is possible to provide a recording medium for storing a bitstream received and decoded by an image decoding apparatus according to the present invention and used to restructure an image.

MODE FOR INVENTION

Figure 1:
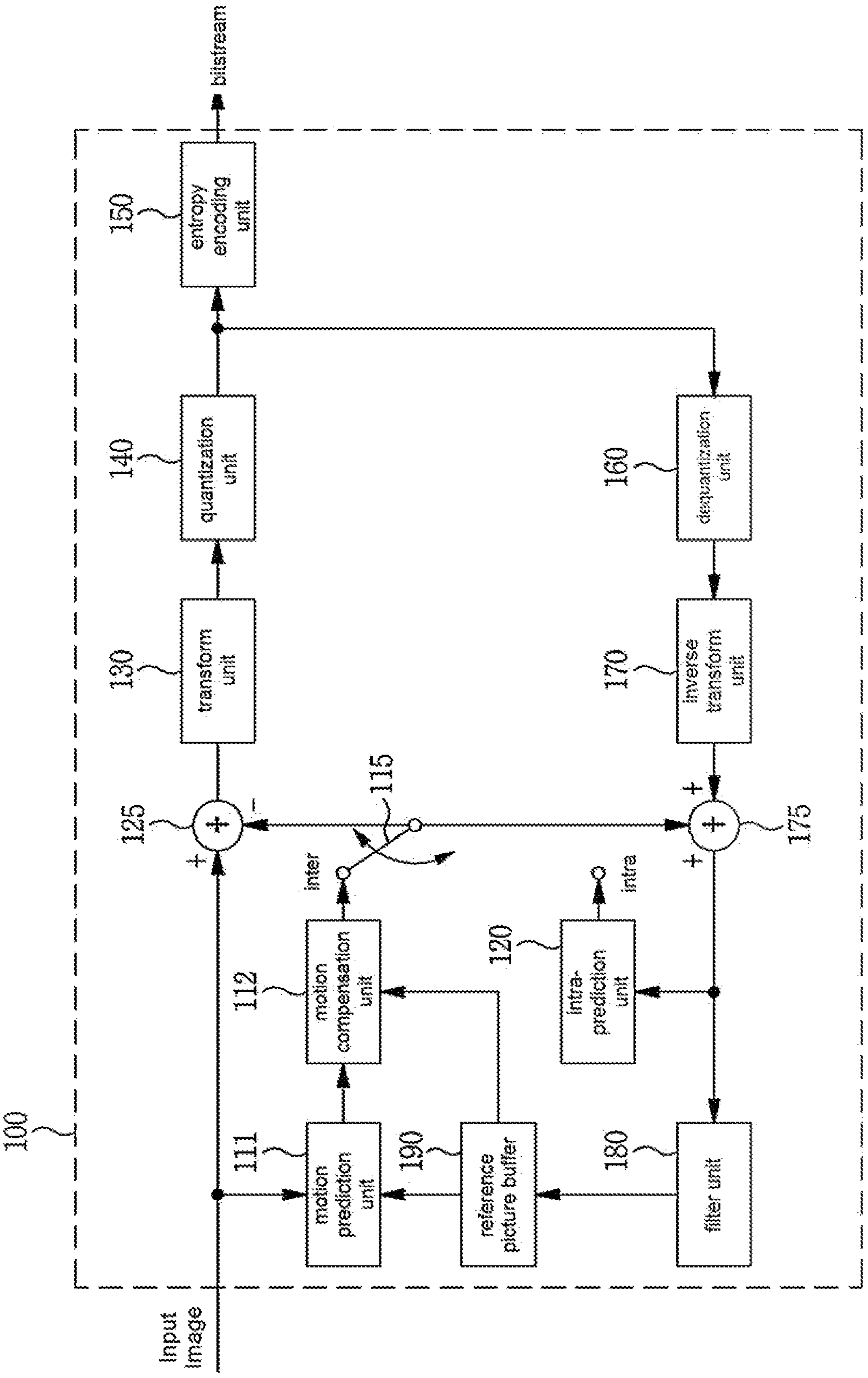
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
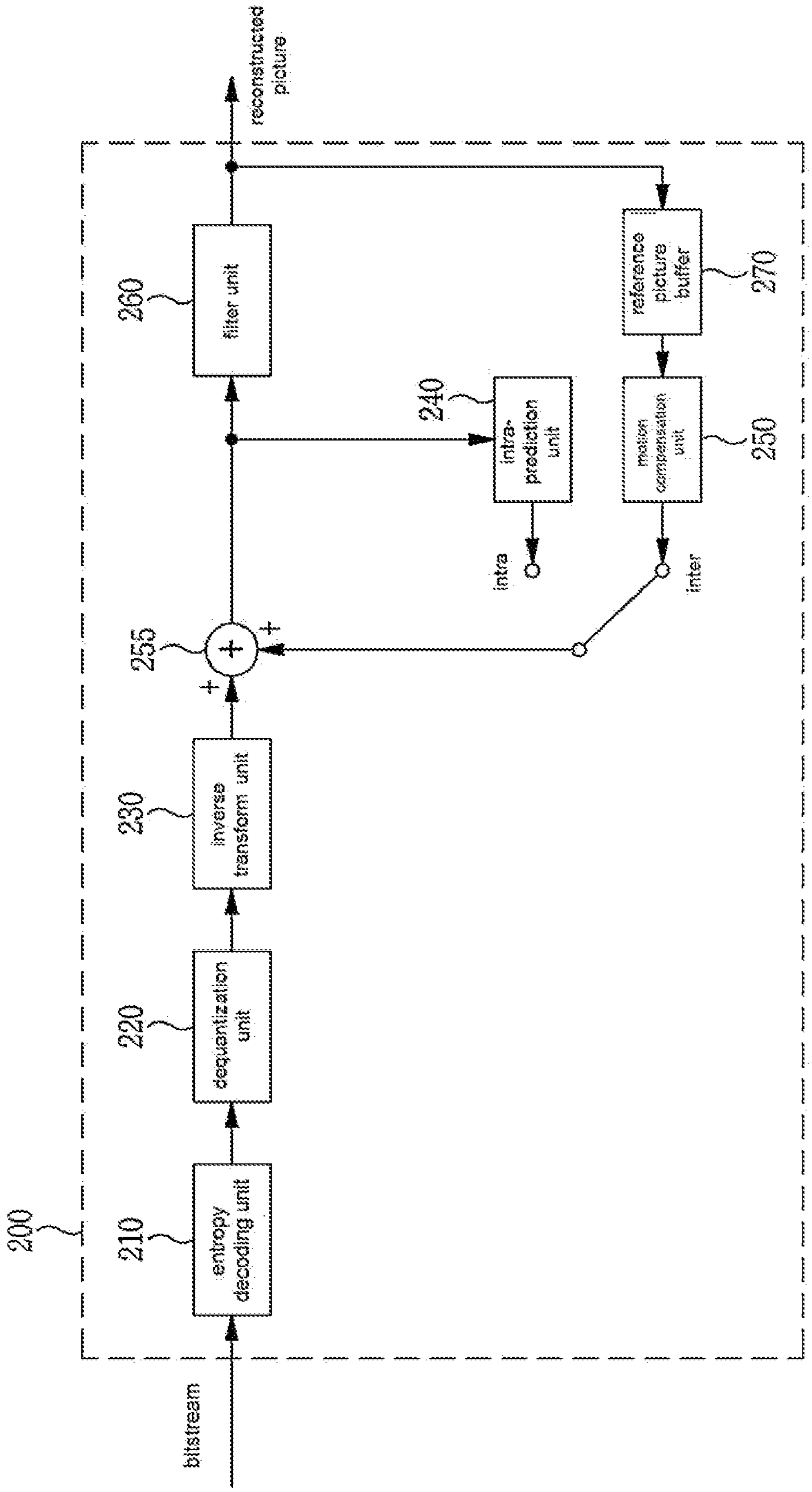
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
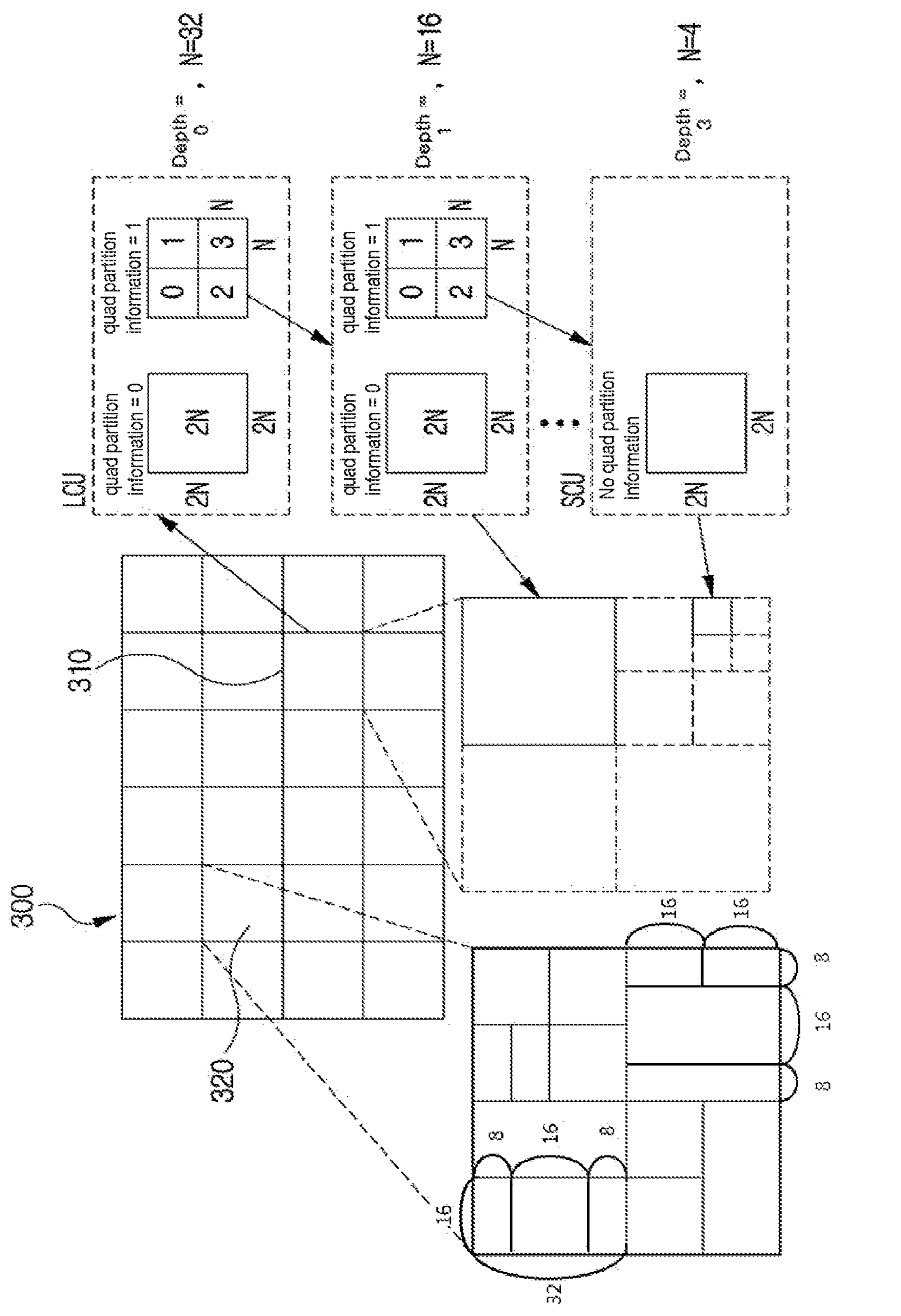
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and an LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

- N×M (N and/or M is 128) Ternary tree partitioning for coding units
- 128×N (N<=64) Binary tree partitioning in horizontal direction for coding units
- N×128 (N<=64) Binary tree partitioning in vertical direction for coding units Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
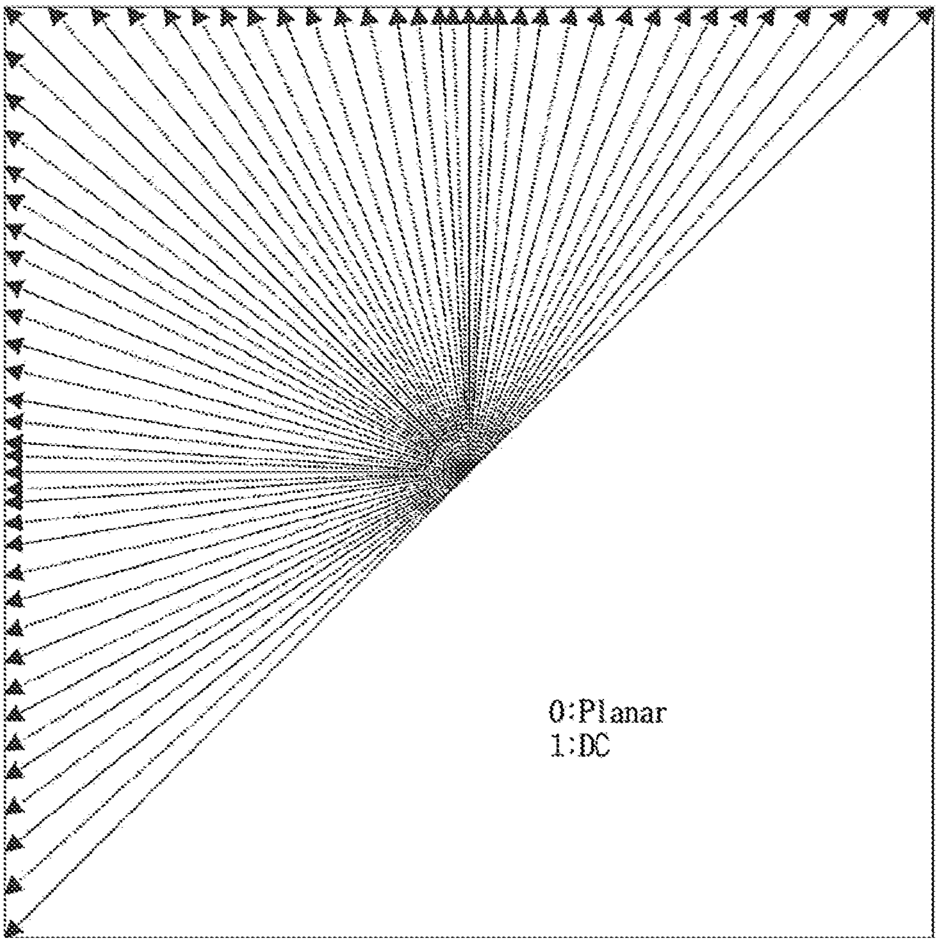
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
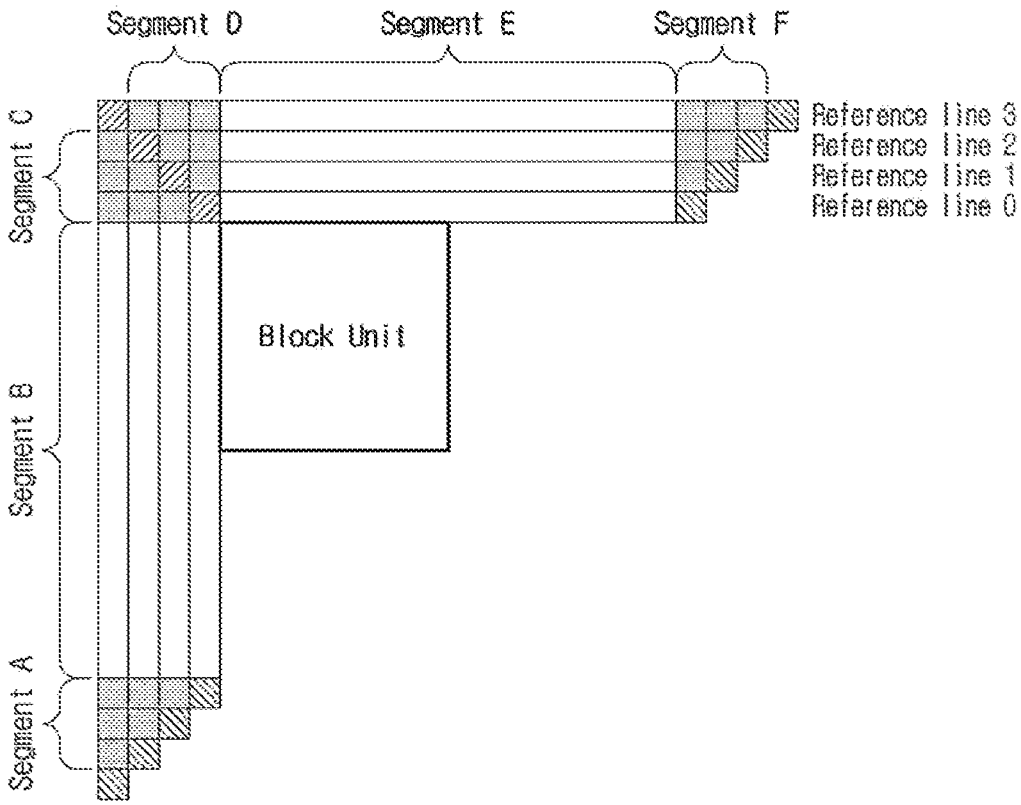
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1 and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructured block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
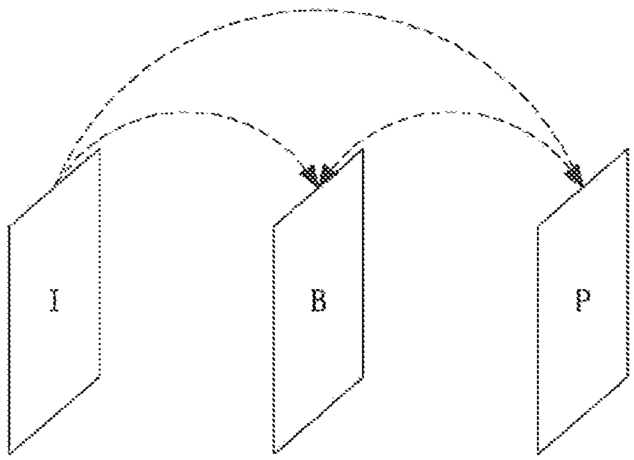
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The geometric partitioning mode may mean a mode that derives motion information by partitioning the current block into the pre-defined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
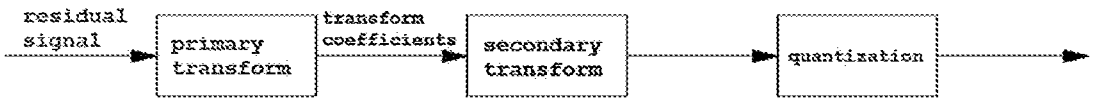
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

In the present invention, encoding/decoding may mean entropy encoding/decoding.

Hereinafter, with reference to FIG. 8 to FIG. 15, an image encoding/decoding method according to one embodiment of the present invention is described.

According to the present invention, image encoding/decoding through intra prediction may be performed by deriving an intra-prediction mode, constructing a reference sample and/or performing intra prediction.

When image encoding/decoding through intra prediction is performed, the step of deriving an intra-prediction mode of a current block may be performed.

Herein, the intra-prediction mode of a current block may be derived by using at least one among an intra-prediction mode of a neighboring block, entropy encoding/decoding of the intra-prediction mode of a current block from a bit-stream, a coding parameter of a neighboring block and/or an intra-prediction mode of a color component.

In addition, an intra-prediction mode of a current block or a sub-block may be determined based on at least one among a reference sample line indicator (intra_luma_ref_idx), a block partition indicator (intra_subblock_flag), a block partition direction indicator (intra_subblock_type_flag) and CIIP (Combined Inter and Intra Prediction) mode indicator. Here, a block partition indicator (intra_subblock_flag) may be used in the same meaning as a partition split indicator (intra_subpartitions_mode_flag). In addition, a block partition direction indicator (intra_subblock_type_flag) may be used in the same meaning as a partition split direction indicator (intra_subpartitions_split_flag).

A block partition indicator may indicate whether or not a current block that is intra predicted is partitioned. In addition, a block partition direction indicator may indicate whether the partition direction of a current block that is intra predicted is the horizontal direction or the vertical direction. A block partition direction indicator may be signaled when a block partition indicator indicates "partition". When a block partition indicator indicates "partition", a current block may be partitioned into two or four sub-blocks. For example, when the size of a current block is 4×8 or 8×4, the current block may be partitioned into two sub-blocks. When the size of a current block is 8×8 or more, the current block may be partitioned into four sub-blocks. Here, as described above, the direction of partition may be derived by a block partition direction indicator. Each of partitioned sub-blocks may be sequentially encoded and decoded according to a predetermined order. The predetermined order may proceed from top to bottom for horizontal direction partition and from left to right for vertical direction partition. At least one sample included in a reconstructed sub-block may be used as a reference sample of a sub-block of the next order. An intra-prediction mode for a current block may be commonly used as intra-prediction mode for each sub-block.

According to one embodiment of the present invention, at least one or more reconstructed neighboring blocks may be used to derive an intra-prediction mode of a current block. Here, a neighboring block may be used in the same meaning as adjacent block.

The position of a reconstructed neighboring block may be a predetermined and fixed one or may be determined through encoding/decoding. For example, if the coordinate of the upper left corner sample of a current block with the size of W×H is (0, 0), the neighboring block may be at least one among blocks adjacent to coordinates (−1, H−1), (W−1, −1), (W, −1), (−1, H) and (−1, −1) and neighboring blocks of the blocks. Here, W and H may indicate the horizontal length (=width) and vertical length (=height) of a current block or the number of samples.

When an intra-prediction mode of a current block is derived by using an intra-prediction mode of a neighboring block, an intra-prediction mode of an unavailable neighboring block may be replaced by a predetermined intra-prediction mode. Here, the predetermined intra-prediction mode may be at least one among a DC mode, a PLANAR mode, a vertical mode, a horizontal mode and/or a diagonal mode.

For example, when a neighboring block is positioned outside the boundary of at least one unit among picture, slice, tile and CTU (Coding Tree Unit), when a neighboring block is intra predicted, and when a neighboring block is coded into IBC mode, MIP mode or PCM mode, the corresponding neighboring block may be judged as unavailable. However, when a neighboring block is intra predicted and an indicator showing whether or not inter prediction and intra prediction are combined (for example, inter_intra_flag) is '1' (or 'True'), the corresponding neighboring block may be judged as available.

In addition, an intra-prediction mode of a current block may be derived as a statistical value of an intra-prediction mode of two or more neighboring blocks. Herein, a statistical value may be at least one among an average value, a maximum value, a minimum value, a most frequent value, a median value, a weighted average value, and an interpolated value.

In addition, an intra-prediction mode of a current block may be derived based on sizes of neighboring blocks. For example, an intra-prediction mode of a relatively large neighboring block may be derived as the intra-prediction mode of a current block. Alternatively, when an intra-prediction mode of a current block is derived from a statistical value of an intra-prediction mode of a neighboring block, a large weight may be given to an intra-prediction mode of a relatively large neighboring block.

In addition, when an intra-prediction mode of a current block is derived, it may be considered whether an intra-prediction mode of a neighboring block is directional or not. For example, an intra-prediction mode of a neighboring block is non-directional (for example, DC, PLANAR, etc.), the corresponding non-directional mode may be derived as an intra-prediction mode of a current block. Alternatively, on the contrary, an intra-prediction mode of a current block may be derived by using intra-prediction modes of other neighboring blocks than a neighboring block with the corresponding non-directional mode.

In order to derive an intra-prediction mode of a current block, one or more MPM (Most Probable Mode) lists may be constructed by using an intra-prediction mode of a neighboring block. The number N of candidate modes included in an MPM list may have a fixed value or be determined according to the size and/or shape of a current block. In addition, an MPM list may be constructed so that there is no duplicate mode.

Herein, when the number of available candidate modes is less than N, a predetermined candidate mode among available candidate modes may be added to an MPM list. For example, a mode that is obtained by adjusting a predetermined offset to a directional mode may be added to an MPM list. Here, the predetermined offset may be a positive integer (for example, 1, 2, 3, 4, etc.). Alternatively, at least one among a horizontal mode, a vertical mode, a 45-degree mode, a 135-degree mode, a 225-degree mode and a non-directional mode may be added to an MPM list.

Based on the position of a neighboring block, an MPM list may be constructed according to a predetermined order. For example, an MPM list may be constructed in the order of blocks that are adjacent to the left, top, bottom left corner, top right corner and top left corner of a current block. Here, a non-directional mode may be included in an arbitrary position of MPM list. For example, a non-directional mode may be added next to the intra-prediction modes of blocks adjacent to the left and top of a current block.

Alternatively, when an MPM list is constructed, a non-directional mode (for example, DC mode, PLANAR mode and the like) may be always added. A non-directional mode may have a high probability of occurrence, since prediction is performed by using both top and left reference samples. Accordingly, as DC mode and PLANAR mode are always added to an MPM list, a bit overhead for signaling an intra-prediction mode may be reduced.

According to an embodiment of the present invention, an intra-prediction mode of a current block may be derived by using an intra-prediction mode, which is derived by using an MPM list, and an intra-prediction mode of a neighboring block.

For example, when an intra-prediction mode that is derived by using an MPM list is Pred_mpm, Pred_mpm may be changed by using an intra-prediction mode of a neighboring block. Herein, if Pred_mpm is larger than an intra-prediction mode of a neighboring block or a statistical value of two or more intra-prediction modes, Pred_mpm may increase by n. Alternatively, if Pred_mpm is smaller than an intra-prediction mode of a neighboring block or a statistical value of two or more intra-prediction modes, Pred_mpm may decrease by n. Here, n may be a predetermined integer (for example, 1, 2, 3, 0, −1, −2, −3, etc.). An intra-prediction mode of a current block may be derived as a changed Pred_mpm.

In addition, when at least one of Pred_mpm and an intra-prediction mode of a neighboring block is a non-directional mode (for example, DC mode, PLANAR mode, etc.), an intra-prediction mode of a current block may be derived as the non-directional mode. Alternatively, on the contrary, an intra-prediction mode of a current block may be derived as a directional mode.

According to an embodiment of the present invention, an intra-prediction mode of a different color component may be used to derive an intra-prediction mode of a current block.

For example, when a current block is a chroma block, an intra-prediction mode of a luma block corresponding to the chroma block may be used. Herein, there may be one or more corresponding luma blocks, and the number of corresponding luma blocks may be determined based on at least one among the size and shape of a chroma block and/or a coding parameter. Alternatively, a corresponding luma block may be determined based on at least one among the size and shape of a luma block and/or a coding parameter.

A luma block corresponding to a chroma block may include a multiplicity of partitions. All or part of multiple partitions may have different intra-prediction modes.

An intra-prediction mode of a chroma block may be derived based on all or part of multiple partitions within a corresponding luma block. Herein, some partitions may be selectively used through comparison of the size, shape, depth and other information between a chroma block and a luma block (all or some of multiple partitions).

In addition, a partition at a position within a luma block corresponding to a predetermined position of a chroma block may be selectively used. In this case, a predetermined position may mean the position of a central sample or a corner sample (for example, a top-left sample) of a chroma block.

A method of deriving an intra-prediction mode between color components according to an embodiment of the present invention is not limited to using an intra-prediction mode of a corresponding luma block. For example, an intra-prediction mode of a chroma block may be derived by using at least one among the mpm_idx of a corresponding luma block or an MPM list. In addition, an intra-prediction mode of a chroma block may be derived by sharing at least one among the mpm_idx of a corresponding luma block or an MPM list.

Figure 8:
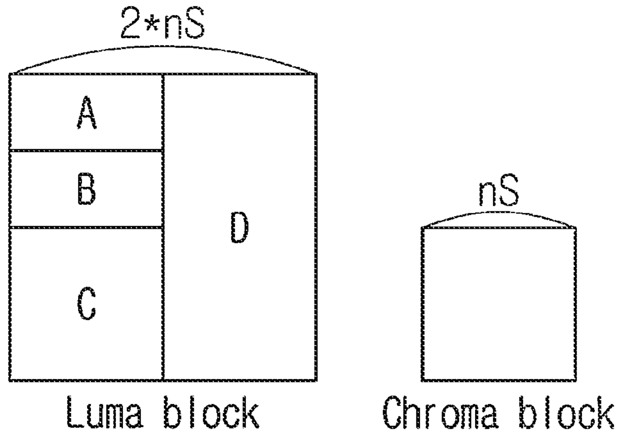
FIG. 8 is a view for explaining the relationship between a luma block and a chroma block.

FIG. 8 is a view for explaining the relationship between a luma block and a chroma block.

Referring to FIG. 8, a ratio among color components may be 4:2:0, and a luma block corresponding to a chroma block may be at least one or more among A, B, C and D.

An intra-prediction mode of a chroma block may be derived by using an intra-prediction mode of the luma block A corresponding to the top-left position (0, 0) within the chroma block or an intra-prediction mode of the luma block D corresponding to the position of central sample (nS/2, nS/2) of the chroma block. Here, a predetermined position within a chroma block is not limited to (0.0) and (nS/2, nS/2) and may be the position of top-right, bottom-left and/or bottom-right sample within the chroma block.

A predetermined position within a chroma block may be determined based on the shape of the chroma block. For example, when the shape of a chroma block is square, a predetermined position within the chroma block may be the position of a central sample. In addition, when the shape of a chroma block is rectangular, a predetermined position within the chroma block may be the position of a top-left sample. Alternatively, in the above example, a predetermined position within a square chroma block and a predetermined position within a rectangular chroma block may be opposite to each other.

In addition, an intra-prediction mode of a chroma block may be derived by using a statistical value of one or more intra-prediction modes within a luma block corresponding to the size of the chroma block. Herein, a statistical value may be at least one among an average value, a maximum value, a minimum value, a most frequent value, a median value, a weighted average value, and an interpolated value.

For example, referring to FIG. 8, a mode corresponding to the average of the intra-prediction modes of the luma blocks A and D or a mode corresponding to the average of the intra-prediction modes of the luma blocks A, B, C and D corresponding to the size of a chroma block may be derived as the intra-prediction mode of the chroma block.

When there is a multiplicity of intra-prediction modes of an available luma block, all or some of the intra-prediction modes may be selected. Here, all or some of the intra-prediction modes of a luma block may be selected based on a predetermined position within a chroma block or based on the size, shape and/or depth of a chroma block and/or a luma block. By using an intra-prediction mode of a luma block thus selected, an intra-prediction mode of a chroma block may be derived.

For example, the size of luma block A corresponding to the position (0, 0) of the top-left sample within a chroma block may be compared with the size of luma block D corresponding to the position (nS/2, nS/2) of the central sample within the chroma block. As a result, an intra-prediction mode of the chroma block may be derived by using an intra-prediction mode of the luma block D that is relatively large.

In addition, when the size of a luma block corresponding to a predetermined position within a chroma block is equal to or larger than the size of the chroma block, an intra-prediction mode of the chroma block may be derived by using an intra-prediction mode of the corresponding luma block.

In addition, when the size of a chroma block is within a predetermined range, an intra-prediction mode of the chroma block may be derived by using an intra-prediction mode of a luma block corresponding to the position (0, 0) of the top-left sample within the chroma block.

Here, the predetermined range may be derived based on at least one piece of information among information signaled through a bitstream, the size of a chroma block and/or a luma block, the depth of a chroma block and/or a luma block, and information predefined in an encoder/decoder.

In addition, among multiple partitions within a luma block, a partition with the same shape as a chroma block is used to derive an intra-prediction mode of the chroma block. For example, when the shape of a chroma block is square or rectangular, an intra-prediction mode of the chroma block may be derived by using a square or non-square partition among multiple partitions within a luma block.

In the above description concerning FIG. 8, deriving an intra-prediction mode of a chroma block by using an intra-prediction mode of a luma block may include a case where the intra-prediction mode of the luma block is used as the intra-prediction mode of the chroma block as it is.

In addition, apart from the case where an intra-prediction mode of a luma block is used as an intra-prediction mode of a chroma block as it is, a case may be included where information (for example, mpm_idx, MPL list, etc.) used to derive an intra-prediction mode of a luma block is used to derive an intra-prediction mode of a chroma block.

In addition, an intra-prediction mode of a luma block corresponding to a predetermined position within a chroma block may be used to derive an MPM list for the chroma block. Here, information (for example, mpm_idx) for a chroma block may be encoded and signaled. An MPM list for a chroma block may be constructed in a similar way to an MPM list for a luma block. Alternatively, an MPM candidate of a chroma block may include at least one among an intra-prediction mode of a neighboring chroma block and/or an intra-prediction mode of the corresponding luma block.

When an MPM list for a chroma block is constructed, if an indicator (for example, MPM flag) indicating whether or not an intra-prediction mode of a current block is included in an MPM list is "0", a second MPM list including one or more intra-prediction modes may be constructed. In addition, a second MPM index (for example, 2nd_mpm_idx) may be used to derive an intra-prediction mode of a current block. Here, a second indicator (for example, 2nd MPM flag) indicating whether or not an intra-prediction mode of a current block is included in a second MPM list may be encoded/decoded. Similar to a first MPM list, a second MPM list may be constructed by using the intra-prediction modes of a neighboring block. Herein, an intra-prediction mode included in a first MPM list may not be included in a second MPM list. The number of MPM lists used for deriving an intra-prediction mode of a current block is not limited to 1 or 2, but N MPM lists may be used (Here, N is a positive integer).

For another example, two MPM lists may be constructed, and information (for example, mpm_flag) indicating whether or not an intra-prediction mode of a current block is included in the two MPM lists may be signaled. When an intra-prediction mode of a current block is included in at least one of two MPM lists, information (for example, first_mpm_flag) indicating whether or not the intra-prediction mode of the current block is included in the first MPM list may be signaled.

For example, when first_mpm_flag has a first value (for example, 1), it may indicate that an intra-prediction mode of a current block is included in a first MPM list. When first_mpm_flag has a first value, based on index information for a first MPM list, an intra-prediction mode of a current block may be determined as one of the MPM candidates included in the first MPM list. When a first MPM list includes only one MPM candidate, separate index information may not be signaled. In this case, if first_mpm_flag has a first value, an intra-prediction mode of a current block may be determined as the one MPM candidate included in a first MPM list.

For example, when first_mpm_flag has a second value (for example, 0), it may indicate that an intra-prediction mode of a current block is not included in a first MPM list. When first_mpm_flag has a second value, an intra-prediction mode of a current block may be determined to be included in a second MPM list. Accordingly, in this case, index information indicating one of the modes included in a second MPM list may be signaled. An intra-prediction mode of a current block may be determined as one MPM candidate specified by the index information among MPM candidates included in a second MPM list.

When an intra-prediction mode of a current block is not included in one of multiple MPM lists, an intra-prediction mode of a luma component of a current block may be encoded/decoded. In addition, an intra-prediction mode of a chroma component may be encoded/decoded or derived based on an intra-prediction mode of the corresponding luma component.

When a current block is partitioned into sub-blocks, intra-prediction modes for each sub-block thus obtained may be derived based on at least one among the above-described methods. Alternatively, as described above, an intra-prediction mode derived for a current block may be uniformly used for each of sub-blocks.

The size and/or shape of a sub-block may be a predetermined size (for example, 4×4) and/or shape. Alternatively, the size and/or shape of a sub-block may be determined based on the size and/or shape of a current block.

In addition, the size of a sub-block may be determined based on whether or not a neighboring block of a current block is partitioned or based on an intra-prediction mode of a neighboring block of a current block. For example, the size of a sub-block may be determined by partitioning a current block based on a boundary where neighboring blocks have different intra-prediction modes. Alternatively, the size of a sub-block may be determined as a current block is partitioned based on whether a neighboring block is a coding block of intra prediction or inter prediction.

Whether or not the size of a current block is a predetermined size may be judged based on the horizontal length or vertical length of a current block. For example, if a horizontal length or a vertical length is a length that can be partitioned, it may be judged that the size of a current block is a predetermined size.

When a current block is partitioned into a multiplicity of sub-blocks, intra-prediction modes of the multiplicity of sub-blocks may be derived in a zigzag order or in parallel. An intra-prediction mode of a sub-block may be derived through at least one or more methods of deriving an intra-prediction mode of a current block. Here, a neighboring block of a current block may be used as a neighboring block of each sub-block. In addition, a sub-block within a current block may be used as a neighboring block of each sub-block.

An intra-prediction mode of a sub-block within a current block may be derived by using an intra-prediction mode of a current block and an average value of the intra-prediction modes of blocks adjacent to the left and top of a sample at the position (0. 0) of each sub-block. For example, when an intra-prediction mode of a current block is larger than an average value of the intra-prediction modes of blocks adjacent to the left and top of a sample at the position (0, 0) of each sub-block, the derived intra-prediction mode may decrease by one-half of the average value. Otherwise, that is, an intra-prediction mode of a current block is equal to or smaller than an average value of the intra-prediction modes of blocks adjacent to the left and top of a sample at the position (0, 0) of each sub-block, the derived intra-prediction mode may increase.

Information on intra prediction may be signaled through at least one among VPS(Video Parameter Set), SPS(Sequence Parameter Set), PPS(Picture Parameter Set), APS (Adaptation Parameter Set), slice header and tile header. Here, for a predetermined block size or below, at least one or more pieces of information on intra prediction may not be signaled. When at least one or more pieces of information on intra prediction are not signaled, information on the intra prediction of a block (for example, an upper block), which is encoded/decoded before a current block is encoded/decoded, may be used.

When image encoding/decoding through intra prediction is performed, an intra-prediction mode may be derived as a current block is partitioned into predetermined sub-blocks, and intra prediction may be performed. Herein, a current block may be partitioned into sub-blocks based on at least one among the size/shape of the current block and the size/shape of a sub-block.

Figure 9:
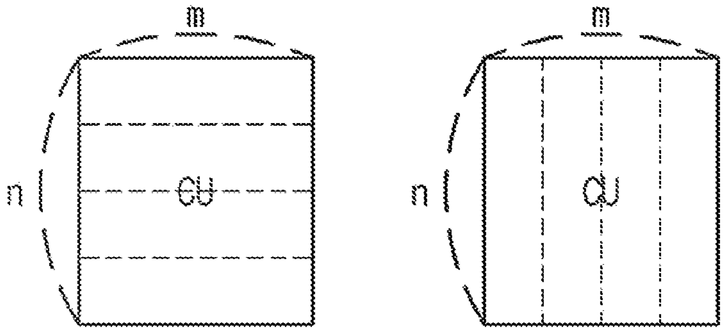
FIG. 9 is a view for explaining an embodiment where a current block is partitioned into sub-blocks.

FIG. 9 is a view for explaining an embodiment where a current block is partitioned into sub-blocks.

The horizontal or vertical size of a current block may be divided into K equal parts, thereby being partitioned into sub-blocks. Here, K may be an integer that is equal to or greater than 1.

For example, referring to FIG. 9, when a current block has the size of M×N and is partitioned into four equal parts, the size of a sub-block may be (M/4)×N or M×(N/4). Accordingly, for example, when the size of a current block is 32×16, the current block may be partitioned into four sub-blocks, each of which has a size of 8×16 or 32×4.

Figure 10:
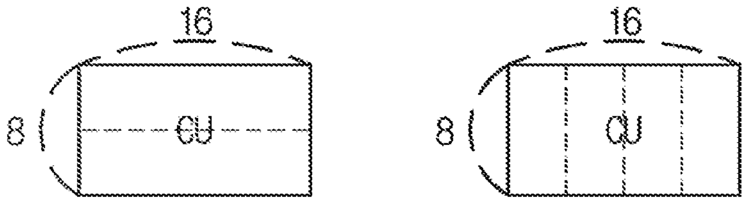
FIG. 10 is a view for explaining an embodiment where a current block is partitioned into sub-blocks.

FIG. 10 is a view for explaining an embodiment where a current block is partitioned into sub-blocks.

When the horizontal size or vertical size of a current block is within a predetermined range, the current block may be partitioned into K equal parts. Otherwise, the current block may be partitioned into L equal parts. Here, L and K are different, and both may be an integer that is equal to or greater than 2.

For example, when a horizontal size or a vertical size is equal to or greater than 16, a current block may be partitioned into four equal parts. When a horizontal size or a vertical size is 8, a current block may be partitioned into two equal parts. In addition, when a horizontal size or a vertical size is less than 8, partitioning may not be performed.

As illustrated in FIG. 10, when the size of a current block is 16×8, the vertical size is 8 and thus the current block may be partitioned into two equal parts. In addition, since the horizontal size is 16, the current block may be partitioned into four equal parts. In other words, the current block with the size of 16×8 may be partitioned into two 16×4 sub-blocks or four 4×8 sub-blocks.

Alternatively, as described above, when a current block is a 4×8 block or an 8×4 block, it may be partitioned into two equal parts. When a current block is an 8×8 or greater block, it may be partitioned into four equal parts.

When a current block is partitioned into sub-blocks, information on partition type may be signaled. Information on partition type may include at least one of a block partition indicator (for example, intra_subblock_flag, intra_subpartitions_mode_flag, etc.) and a block partition direction indicator (for example, intra_subblock_type_flag, intra_subpartitions_split_flag, etc.). Herein, a block partition direction indicator may indicate whether a current block is to be partitioned in the vertical direction (for example, the horizontal size of the current block is partitioned into K equal parts) or in the horizontal direction (for example, the vertical size of the current block is partitioned into K equal parts).

When the horizontal size or vertical size of a current block is a predetermined size, a block partition indicator may be signaled. For example, when the horizontal size or vertical size of a current block is equal to or smaller than a maximum transform size, a block partition indicator may be signaled. The maximum transform size may be 64.

In addition, when the horizontal size or vertical size of a current block is larger than a predetermined size, a block partition indicator may be signaled. For example, the product of the horizontal size and the vertical size of a current block is larger than the square of a minimum transform size, a block partition indicator may be signaled. For example, the minimum transform size may be 4. When the product of the horizontal size and the vertical size of a current block is greater than 16 (=4×4), a block partition indicator may be signaled.

When the horizontal size or vertical size of a current block is a predetermined size, a block partition direction indicator may be signaled. For example, when both the horizontal size and the vertical size of a current block are larger than a minimum transform size (for example, 4), a block partition direction indicator may be signaled.

Meanwhile, when one of the horizontal size and the vertical size of a current block is a minimum transform size (for example, 4×N or N×4), a partition direction may be inferred with no block partition direction indicator being signaled. For example, when a horizontal size is a minimum transform size, a partition direction may be inferred in the horizontal direction. In addition, when a vertical size is a minimum transform size, a partition direction may be inferred in the vertical direction. For example, when the size of a current block is 4×16, a partition direction is inferred in the horizontal direction and thus the current block may be partitioned into four sub-blocks, each of which has a size of 4×4. Alternatively, when the size of a current block is 8×4, a partition direction is inferred in the vertical direction and thus the current block may be partitioned into two sub-blocks, each of which has a size of 4×4.

Figure 11:
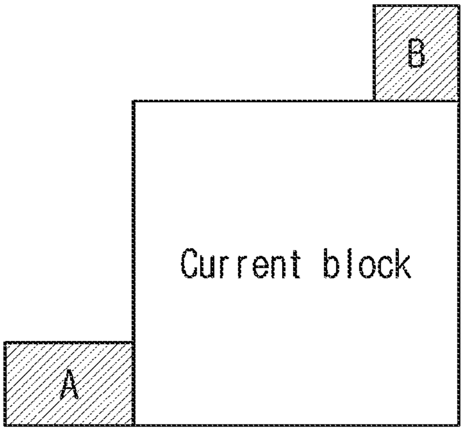
FIG. 11 is a view for explaining an intra-prediction mode of a neighboring block, which is used to derive an intra-prediction mode of a current block, according to an embodiment of the present invention.

FIG. 11 is a view for explaining an intra-prediction mode of a neighboring block, which is used to derive an intra-prediction mode of a current block, according to an embodiment of the present invention.

When an intra-prediction mode of a current block is derived, an MPM may be derived by using an intra-prediction mode of a neighboring block.

For example, referring to FIG. 11, an MPM may be derived by using the intra-prediction mode A of a neighboring block adjacent to the left of a current block and the intra-prediction mode B of a neighboring block adjacent to the top of a current block. Here, an MPM may be derived by using a statistical value of A and B (for example, at least one among an average value, a maximum value, a minimum value, a most frequent value, a median value, a weighted average value, and an interpolated value).

In addition, an MPM may be derived by adding or subtracting a predetermined offset (for example, 1, 2, 3, . . . ) to or from A, B or a statistical value of A and B.

In addition, an MPM may be derived by applying modular calculation (%) and/or offset to A, B or a statistical value of A and B.

Figure 12:
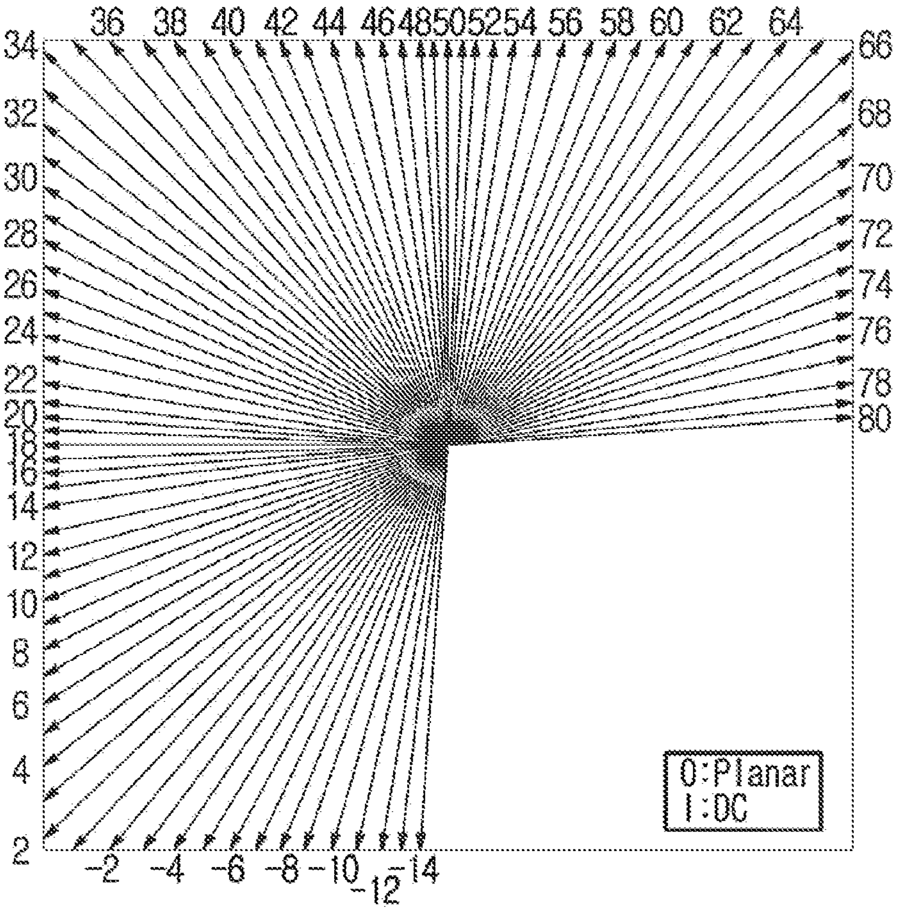
FIG. 12 is a view illustrating an example of intra-prediction mode according to an embodiment of the present invention.

FIG. 12 is a view illustrating an example of intra-prediction mode according to an embodiment of the present invention.

In FIG. 12, the direction of a dotted line shows a wide angle mode that is applied only to a non-square block. As shown in FIG. 12, an intra-prediction mode may include 93 directional modes together with 2 non-directional modes. Non-directional modes may include a planar mode and a DC mode. As illustrated by arrows in FIG. 12, directional modes may include modes from No. 2 to No. 80 and No. −1 to No. −14.

When an intra-prediction mode of a current block is derived, an MPM or an intra-prediction mode may be derived based on at least one among a reference sample line indicator (for example, intra_luma_ref_idx), a block partition indicator (for example, intra_subblock_flag, intra_subpartitions_mode_flag, etc.), a block partition direction indicator (for example, intra_subblock_type_flag, intra_subpartitions_split_flag, etc.) and an indicator showing whether or not inter prediction and intra prediction are combined (for example, inter_intra_flag, ciip_flag).

Figure 13:
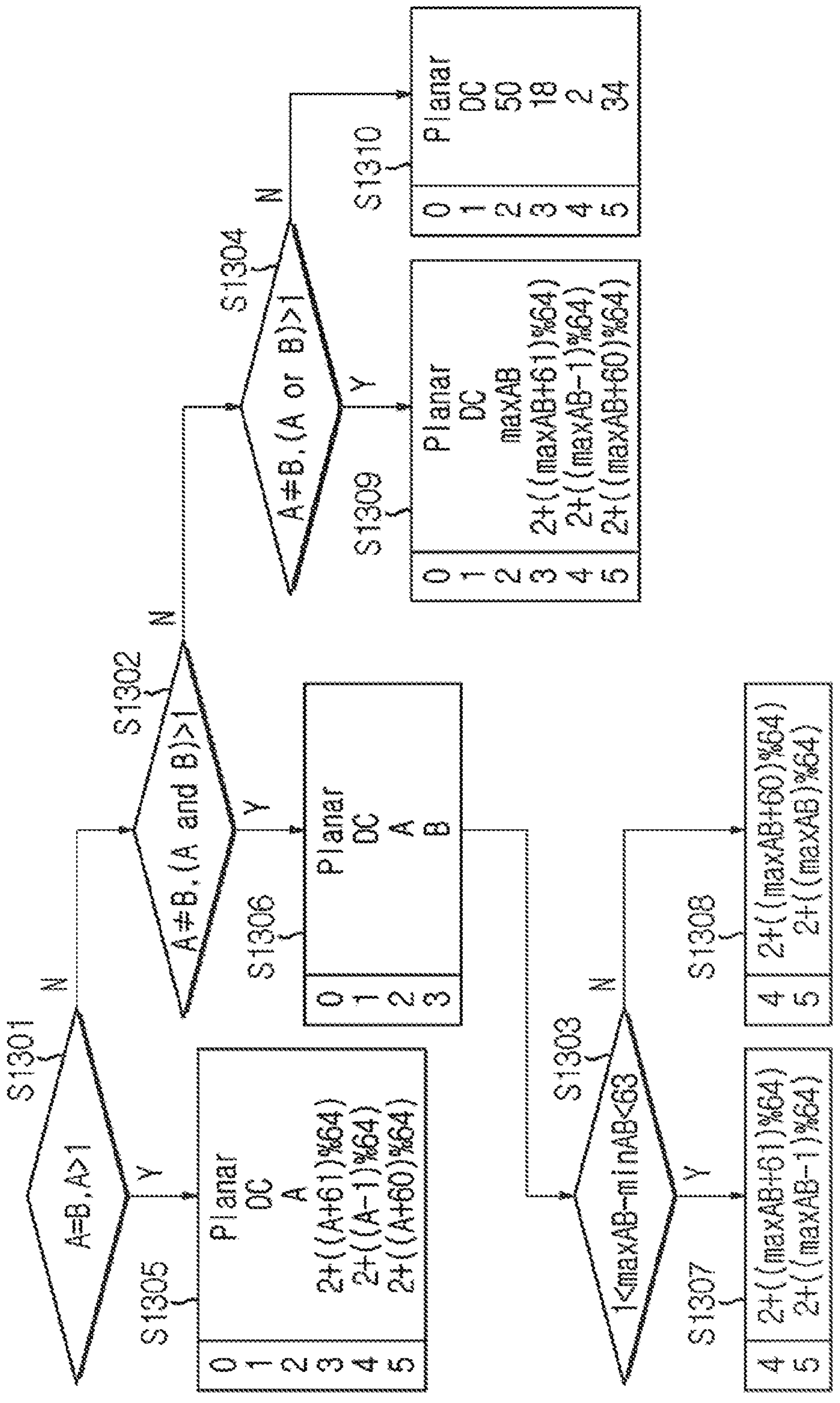
FIG. 13 is a view for explaining a process of deriving an MPM according to an embodiment of the present invention.

FIG. 13 is a view for explaining a process of deriving an MPM according to an embodiment of the present invention.

Referring to FIG. 13, an MPM list for a current block may be constructed based on the intra-prediction mode A of a neighboring block adjacent to the left of a current block and the intra-prediction mode B of a neighboring block adjacent to the top of a current block.

When A and B are the same mode and a directional mode (for example, a mode greater than 1) (S1301—'true'), a list including six MPM candidates in the order of Planar, DC, A, 2+((A+61)% 64), 2+((A−61)% 64) and 2+((A+60)% 64) may be constructed (S1305).

When A and B are different modes and both are directional modes (S1302-'true'), an MPM list including four MPM candidates in the order of Planar, DC, A and B may be constructed (S1306). In addition, the larger mode of A and B and the smaller mode of A and B may be determined as maxAB and minAB respectively. Here, if a difference between maxAB and minAB is greater than 1 but less than 63 (S1303—'true'), two MPM candidates may be added to the MPM list in the order of 2+((maxAB+61)% 64) and 2+((maxAB−1)% 64) (S1307). In addition, if a difference between maxAB and minAB is 1 or equal to or greater than 63 (S1303—'false'), two MPM candidates may be added to the MPM list in the order of 2+((maxAB+60)% 64) and 2+((maxAB) % 64) (S1308).

When A and B are different modes, one is a directional mode and the other is a non-directional mode (S1304—'true'), an MPM list including six MPM candidates in the order of Planar, DC, maxAB, 2+((maxAB+61)% 64), 2+((maxAB−1)% 64) and 2+((maxAB+60)% 64) may be constructed (S1309).

In other cases than the above-described cases (S1304—'false'), for example, when A and B are the same and a non-directional mode (for example, a mode that is equal to or less than 1), or when A and B are different but both are non-directional modes, an MPM list including six MPM candidates in the order of Planar, DC, 50, 18, 2 and 34 may be constructed (S1310).

An MPM list for a current block may be differently constructed based on a reference sample line indicator (intra_luma_ref_idx) for the current block. For example, when a reference sample line indicator for a current block is '0' and when it is not '0', an MPM list may be differently constructed. Specifically, when a reference sample line indicator is 0, an MPM list may be constructed according to the conventional method described above. When a reference sample line indicator is not 0, a non-directional mode may not be used as an MPM candidate. For example, when a reference sample line indicator is not 0, a planar mode cannot be used as an MPM candidate. Alternatively, a planar or DC mode, which is a non-directional mode, may be excluded from a constructed MPM list. Accordingly, when a reference sample line indicator is not 0, one directional mode among modes in an MPM list may be derived as an intra-prediction mode of a current block.

Alternatively, as described above, when an MPM list of a current block is constructed as a first MPM list and a second MPM list and the first MPM list is constructed by including only one non-directional mode (for example, planar mode), whether or not the first MPM list is available may be differently determined based on a value of a reference sample line indicator. For example, when the value of a reference sample line indicator is 0, it may be determined that a first MPM list is available. In addition, when the value of a reference sample line indicator is 1, it may be determined that a first MPM list is not available. In addition, in this case, a second MPM list may be determined irrespective of the value of a reference sample line indicator.

For example, in an MPM list derived through the process of FIG. 13, an intra-prediction mode of a current block may be derived by using only four MPMs excluding Planar and/or DC, which is a non-directional mode corresponding to index 0 and 1. As a variant example, irrespective of a value of a reference sample line indicator, a Planar mode that is a non-directional mode may be excluded from an MPM list derived through the process of FIG. 13. In other words, an intra-prediction mode of a current block may be derived by using an MPM list constructing five MPMs including DC mode.

In addition, when a sub-block partition prediction for a current block is performed, an MPM list may be constructed excluding DC mode. Alternatively, DC mode may be excluded from a constructed MPM list.

For example, when a block partition indicator (intra_subpartitions_mode_flag) indicating whether or not a current block is partitioned into sub-blocks is '1' (or 'true'), a non-directional mode (Planar mode and/or DC mode) may be excluded from a constructed MPM list.

As a variant example, when a sub-block partition prediction for a current block is performed, an MPM list may be constructed excluding Planar mode. Alternatively, Planar mode may be excluded from a constructed MPM list.

For example, when a block partition indicator (intra_subpartitions_mode_flag) indicating whether or not a current block is partitioned into sub-blocks is '1' (or 'true'), a Planar mode may be excluded from a constructed MPM list. In other words, a DC mode may be included in an MPM list, irrespective of whether or not a sub-block partition prediction is performed for a current block.

For example, in an MPM list derived through the process of FIG. 13, an intra-prediction mode of a current block may be derived by using only five MPMs excluding DC mode that corresponds to index 1.

Alternatively, as described above, when an MPM list of a current block is constructed as a first MPM list and a second MPM list and the first MPM list is constructed by including only one non-directional mode (for example, planar mode), the second MPM list may be determined irrespective of a value of a block partition indicator.

According to another embodiment of the present invention, when an MPM list of a current block consists of a first MPM list and a second MPM list and the first MPM list is constructed by including only one non-directional mode (for example, planar mode), the second MPM list may be determined independently of a value of a reference sample line indicator and/or a value of a block partition indicator.

In addition, when the combined inter and intra prediction for a current block is performed, an MPM is not derived and intra prediction may be performed by using a planar mode.

For example, when a CIIP mode indicator is '1' (or 'true'), an intra-prediction mode may be determined as a planar mode.

A CIIP mode means a mode where a prediction block of a current block is generated by a weighted sum of an intra prediction block for a current block and an inter prediction block for a current block. When a CIIP mode indicator determines that a CIIP mode is used, both intra prediction and inter prediction may be performed for a current block. Inter prediction of a current block may be performed by using a merge candidate list that is used for general inter prediction mode. In other words, a merge candidate list may be constructed for inter prediction of CIIP. Based on a signaled merge index, a merge candidate may be selected from a merge candidate list. The motion information of the selected merge candidate may be used as motion information for inter prediction of a current block. In addition, without separate signaling of information on an intra-prediction mode for intra prediction of a current block, intra prediction may be performed based on a predetermined mode. The predetermined mode may be signaled at a higher level of block (sequence, picture, slice and tile) or may be predefined in an image encoder and decoder. For example, a planar mode may be fixed as the predetermined mode. When a current block is encoded/decoded as a CIIP mode, a prediction block of the current block may be obtained by a weighted sum of the inter prediction block and the intra prediction block.

When an intra-prediction mode of a current block is derived by using an MPM list, intra-prediction mode information may be signaled. Intra-prediction mode information may be at least one among first_mpm_flag, intra_luma_mpm_flag, intra_luma_mpm_idx and/or intra_luma_mpm_remainder.

intra_luma_mpm_flag may indicate whether or not there is the same mode as an intra-prediction mode of a current block in an MPM list. Here, when intra_luma_mpm_flag is '1', intra_luma_mpm_idx indicating which mode among candidate modes in an MPM list is the same mode as an intra-prediction mode of a current block may be signaled. Alternatively, on the contrary, when intra_luma_mpm_flag is '0', intra_luma_mpm_remainder may be signaled which indicates an intra-prediction mode of a current block among modes except an MPM mode.

It may be determined that at least one among the above intra-prediction modes is not signaled based on at least one among a reference sample line indicator (for example, intra_luma_ref_idx), a block partition indicator (for example, intra_subblock_flag, intra_subpartitions_mode_flag, etc.), a block partition direction indicator (for example, intra_subblock_type_flag, intra_subpartitions_split_flag, etc.) and an indicator showing whether or not inter prediction and intra prediction are combined (for example, inter_intra_flag, ciip_flag).

For example, when a reference sample line indicator for a current block (for example, intra_luma_ref_idx) is not '0', intra_luma_mpm_flag or intra_luma_mpm_remainder may not be signaled. Herein, only intra_luma_mpm_idx may be signaled and thus an intra-prediction mode of a current mode may be derived. In other words, when a reference sample line indicator for a current block is not 0, it may be inferred that an intra-prediction mode of a current block is derived as one of MPM modes. In other words, intra_luma_mpm_flag may be inferred to be 1. Accordingly, in this case, intra_luma_mpm_flag and intra_luma_mpm_remainder may not be signaled and only intra_luma_mpm_idx may be signaled. intra_luma_mpm_idx may be an index indicating one among N MPM modes included in an MPM list. Here, N may be 4, 5, or 6. In addition, when entropy encoding/decoding is performed by truncated rice binarization, each index may be encoded/decoded into 0, 10, 110 and 111.

In addition, when a sub-block partition prediction for a current block is performed, intra_luma_mpm_flag or intra_luma_mpm_remainder may not be signaled. Herein, only intra_luma_mpm_idx may be signaled and thus an intra-prediction mode of a current mode may be derived. Intra_luma_mpm_idx may be an index indicating one among five MPM modes. In addition, when entropy encoding/decoding is performed by truncated rice binarization, each index may be encoded/decoded into 0, 10, 110, 1110 and 1111.

In addition, when the combined inter and intra prediction is performed for a current block, intra_luma_mpm_flag, intra_luma_mpm_idx or intra_luma_mpm_remainder may not be signaled, and a Planar mode may be derived as an intra-prediction mode of the current block.

When image encoding/decoding is performed through intra prediction, the step of constructing a reference sample may be performed. Herein, the step of constructing a reference sample may include at least one or more steps among selecting a reference sample, padding a reference sample and filtering a reference sample.

Based on a derived intra-prediction mode, a reference sample for intra prediction may be constructed. Hereinafter, a current block may mean a prediction block or a sub-block that has a smaller size and/or shape than a prediction block. A reference sample may be constructed by using one or more reconstructed samples adjacent to a current block or a combination thereof. Here, filtering may be performed for a constructed reference sample.

The number and/or position of reconstructed sample lines, which are used to construct a reference sample, may be different according to the position of a current block within a coding tree block. Here, each reconstructed sample in a multiplicity of reconstructed sample lines may be used as a reference sample as it is. Alternatively, a reference sample may also be generated by performing predetermined filtering for a reconstructed sample and using a filtered reconstructed sample. Reconstructed samples, to which a filter is applied, may belong to the same reconstructed sample line or different reconstructed sample lines.

The constructed reference sample may be expressed as ref[m, n], and a neighboring reconstructed sample with or without filtering applied thereto may be expressed as rec[m, n]. Here, m or n may be a predetermined integer indicating the position of a sample. In addition, when the position of a top left sample within a current block is (0, 0), the position of a reference sample adjacent to the top left of a current block may be set as (−1, −1).

In order to construct a reference sample, the availability of a neighboring reconstructed sample may be judged. Here, when the neighboring reconstructed sample is located outside at least one or more regions among picture, slice, tile and CTU, it may be judged to be unavailable. In addition, when constrained intra prediction is performed for a current block and the neighboring reconstructed sample is located in a block that is encoded/decoded by inter prediction, the sample may be judged to be unavailable.

When a neighboring reconstructed sample is judged to be unavailable, another neighboring reconstructed sample that is available may be used and replace the unavailable sample.

For example, starting from the bottom left sample position, an adjacent available sample may be used and replace an unavailable sample.

In addition, an unavailable sample may be replaced by using a combination of available samples. For example, an unavailable sample may be replaced by using an average value of available samples located at both ends of the unavailable sample.

In addition, unavailable samples may be replaced by using information on available reference samples. Here, an unavailable sample may be replaced by using not the value of an adjacent available reference sample but an arbitrary value. The arbitrary value may be either an average value of available sample values or a value considering a gradient of available sample values. Alternatively, both an average value and a gradient may be used. Here, a gradient may be determined based on a difference value of adjacent available samples. Alternatively, apart from the average value, a maximum value, a minimum value, a median value or a weighted sum, to which an arbitrary weight is applied, may be used. Here, an arbitrary weight may be determined based on a distance between an available sample and an unavailable sample.

The above methods may be applied to all the top and left reference samples or only to an arbitrary direction. In addition, when a reference sample line of a current block is constructed by using a multiplicity of reference sample lines, the methods may also be applied.

Whether or not filtering is to be performed for one or more constructed reference samples may be determined based on at least one among an intra-prediction mode of a current block or the size/shape of a block. When filtering is performed, a filter type may become different according to at least one among an intra-prediction mode of a current block and the size and shape of a block.

When a sub-block partition prediction for a current block is performed, a reference sample for each sub-block may be constructed. Here, the horizontal or vertical length of a reference sample may be twice the horizontal or vertical length of each sub-block.

For example, when the size of a current block is M×N and the current block is horizontally partitioned into four equal parts so that each sub-block has a size of M×(N/4), a reference sample for sub-block may have a horizontal length of 2*M and a vertical length of 2*(N/4). In other words, based on the size of a block where prediction and transform are performed, a reference sample with 2*horizontal length and 2*vertical length may be constructed.

When image encoding/decoding through intra prediction is performed, the step of performing intra prediction may be performed.

Herein, in the step of performing intra prediction, filtering for a prediction sample may be additionally performed. Whether or not to perform the additional filtering may be determined based on at least one or more among an intra-prediction mode, an inter-prediction mode, the horizontal and vertical sizes of a block, the shape of a block, and the position of a sample. Here, at least one among a filter coefficient, a filter tap and a filter shape may be different.

Intra prediction for a current block may be performed based on a derived intra-prediction mode and a reference sample.

When a derived intra-prediction mode is a DC mode, an average value of the one or more constructed reference samples may be used. Herein, filtering may be performed for one or more prediction samples located on the boundary of a current block. Prediction through DC mode may be differently performed based on at least one of the size and shape of a current block. For example, the range of a reference sample used in a DC mode may be specified based on the size and/or shape of a current block and a reference sample line indicator.

Figure 14:
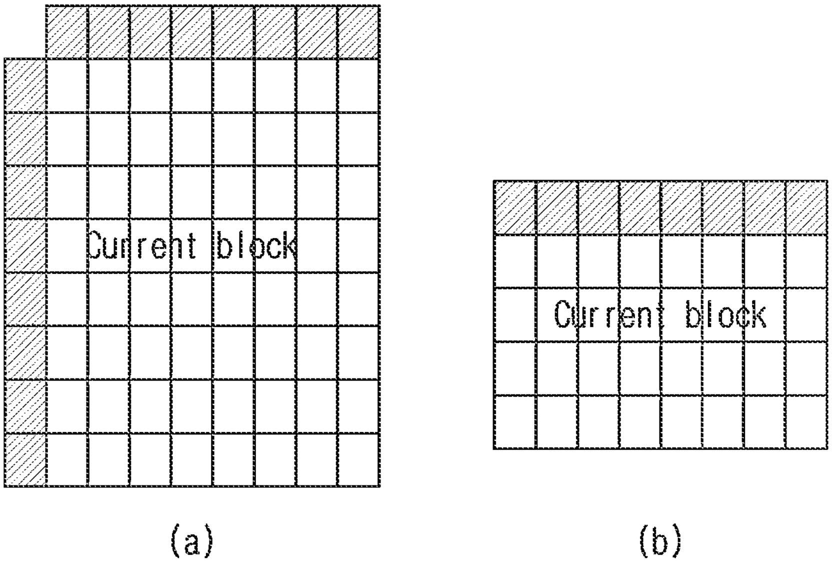
FIG. 14 is a view for explaining an embodiment of DC prediction according to the size and/or shape of a current block in accordance with an embodiment of the present invention.

FIG. 14 is a view for explaining an embodiment of DC prediction according to the size and/or shape of a current block in accordance with an embodiment of the present invention.

Referring to FIG. 14A, when a current block is square, DC prediction may be performed by using an average value of the top and left samples of the current block.

In addition, when a current block is not square, a neighboring sample adjacent to the left or top of the current block may be selectively used. For example, as illustrated in FIG. 14B, when a current block is rectangular, DC prediction may be performed by using an average value of reference samples adjacent to the longer between the horizontal length and the vertical length of the current block.

In addition, when the size of a current block is a predetermined size or within a predetermined range, a predetermined sample of a reference sample line indicated by a reference sample line indicator may be selected among the top or left reference samples of the current block, and DC prediction may be performed by using an average value of samples thus selected.

The predetermined size may mean a fixed size of N×M that is predefined in an encoder/decoder. Here, N and M are integers above 0 and may be the same or different.

The predetermined range may mean a threshold value for selecting a reference sample of a current block. The threshold value may be implemented as at least one of a maximum value and a minimum value. Herein, a minimum value and/or a maximum value may be a fixed value that is predefined in an encoder/decoder or a variable value that is encoded in an encoder and is signaled.

As described above, an average value of one or more reference samples may be used for DC prediction. For calculation of an average value, division using the number of reference samples may be performed. Here, if the number of reference samples is $2^n$ (where n is a positive integer), the division may be replaced by a binary shift operation.

In the case of a non-square block, if both the top and left reference samples are used, the number of reference samples may not be $2^n$, in which case a shift operation cannot be used instead of the division operation. Accordingly, as in the above embodiment, the division operation may be replaced by the shift operation by using only $2^n$ top or left reference samples.

When an intra-prediction mode is a Planar mode, a weighted sum considering a distance from at least one or more constructed reference samples may be used according to the position of a target sample for intra prediction of a current block.

When an intra-prediction mode is a directional mode, one or more reference samples existing on and around a predetermined angular line at the position of a target sample of intra prediction may be used.

When the directional prediction is performed, an intra-prediction mode may be changed to a predetermined mode on the basis of the shape of a current block. In other words, if the intra-prediction mode is a directional mode and the horizontal size and the vertical size of a block are different from each other, the intra-prediction mode may be changed to a predetermined mode on the basis of the ratio between the horizontal size and the vertical size. A ratio between the width and height of a block (whRaito) may be determined by whRatio=Abs (Log 2(nW/nH)). Here, nW and nH may be the horizontal and vertical lengths of a block respectively, and Abs(x) may represent an absolute value of x.

For example, when the horizontal size of a current block is larger than the vertical size thereof, a predetermined directional mode that is predicted from bottom left may be changed to a directional mode that is predicted from top right. In other words, if all the following conditions are satisfied, a predetermined offset may be applied to an intra-prediction mode and thus the intra-prediction mode may be changed by predModeIntra=predModeIntra+65. Here, predModeIntra may mean an intra-prediction mode.

(1) The horizontal size of a block is larger than the vertical size thereof.

(2) predModeIntra is equal to or greater than 2.

(3) predModeIntra is smaller than a predetermined mode. Here, if whRatio is 1, a predetermined mode may be 8, and if whRatio is greater than 1, a predetermined mode may be (8+2*whRatio). Alternatively, a predetermined mode may be fixed to (8+2*whRatio) irrespective of the size of whRatio.

In addition, when the vertical size of a current block is larger than the horizontal size thereof, a predetermined directional mode that is predicted from top right may be changed to a mode that is predicted from bottom left. In other words, if all the following conditions are satisfied, a predetermined offset may be applied to an intra-prediction mode and thus the intra-prediction mode may be changed by predModeIntra=predModeIntra−67.

(1) The vertical size of a block is larger than the horizontal size thereof.

(2) predModeIntra is equal to or less than 66.

(3) predModeIntra is larger than a predetermined mode. Here, if whRatio is 1, a predetermined mode may be 60, and if whRatio is greater than 1, a predetermined mode may be (60−2*whRatio). Alternatively, a predetermined mode may be fixed to (60−2*whRatio) irrespective of the size of whRatio.

When prediction is performed by partitioning a current block into sub-blocks, each sub-block may be predicted by commonly using one intra-prediction mode that is derived based on the current block. In this case, an intra-prediction mode may be changed to a predetermined mode on the basis of the shape of a sub-block (for example, the horizontal and vertical sizes of a block). In other words, an intra-prediction mode of the current block may be derived by using a neighboring intra-prediction mode based on the size of the current block. Based on the horizontal and vertical sizes of a sub-block obtained by partitioning the current block, the derived intra-prediction mode of the current block may be changed to a predetermined mode.

For example, the size of a current block may be 32×32, an intra-prediction mode (predModeIntra) may be 4, and sub-blocks may be constructed by partitioning the current block into four equal parts in the horizontal direction. Here, based on the size 32×8 of each sub-block, the intra-prediction mode (predModeIntra) 4 may be changed by applying the above method. In other words, since whRatio is 2, the horizontal size of a sub-block is larger than the vertical size thereof, predModeIntra is greater than 2, and predModeIntra is less than (8+2*2), the intra-prediction mode may be changed to 69 (=4+65).

For another example, the size of a current block may be 32×8, an intra-prediction mode (predModeIntra) may be 4, and sub-blocks may be constructed by partitioning the current block into four equal parts in the vertical direction. Here, based on the size 8×8 of each sub-block, the intra-prediction mode (predModeIntra) 4 may be changed by applying the above method. However, in this case, since the horizontal and vertical sizes of a sub-block become the same by applying the method, an intra-prediction mode may not be changed.

In the case of a positional information-based intra-prediction mode, a reconstructed sample block, which is generated based on encoded/decoded or derived positional information, may be used as an intra-prediction block of a current block. Alternatively, a decoder may search and derive a reconstructed sample block that is to be used as an intra-prediction block of a current block.

Whether or not a positional information-based intra-prediction mode is applied to a current block may be explicitly signaled as a flag for a current block or may be implicitly derived. In this specification, a flag indicating whether or not a positional information-based intra-prediction mode is applied to a current block may be called IBC (Intra Block Copy) flag.

For example, when a tile group, to which a current block belongs, is I tile group that does not refer to other pictures and the current block is not a skip block, the IBC flag may be signaled.

In addition, when a tile group, to which a current block belongs, is I tile group and the current block is not a general intra-prediction mode, the IBC flag may be signaled.

Availability information indicating whether or not a positional information-based intra-prediction mode is available at an upper level (for example, sequence level, etc.) of a current block may be signaled. Here, the IBC flag may be explicitly signaled only when the availability information indicates availability.

When the IBC flag is not signaled, the IBC flag value may be implicitly derived based on the attribute of a tile group to which a current block belongs.

For example, when a current block is I tile group, the IBC flag value may be derived as a value of available information.

In addition, when a current block is P or B tile group, the IBC flag value may be derived as 0.

When the IBC flag value is 1, it may mean that a positional information-based intra-prediction mode is applied to a current block. When the IBC flag value is 0, it may mean that a positional information-based intra-prediction mode is not applied to a current block.

Positional information may be restored to perform positional information-based intra prediction. Both a current block and a reconstructed sample block are included in a current picture, and positional information may be information on a difference of position between the current block and the reconstructed sample block. Here, restoring positional information may be similar to a way of reconstructing a motion vector of inter prediction.

For example, similar to a merge mode in inter prediction, positional information may be restored from the positional information of a neighboring block. To this end, information indicating a merge mode (for example, MergeFlag=1) may be signaled, and a merge candidate list including N (N is a positive integer) candidates may be constructed.

For example, N may be 5. In other words, a merge candidate list including five merge candidates may be constructed. Here, five merge candidates may be the same as five spatial merge candidates of inter prediction, and the priority order of adding them to a merge candidate list may also be the same. All the five spatial merge candidates may be included in a merge candidate list. In addition, when the number of candidates included in a merge candidate list is less than 5, an additional candidate may be included. Here, the positional information of an additional candidate may an average or a weighted average of the positional information of two candidates that are selected from candidates, which are already included in a merge candidate list, according to a predetermined rule. The two selected candidates may be the first and second candidates of a merge candidate list.

Alternatively, a candidate that is selected from a list of candidates, which are used for intra prediction based on the positional information of a previous block, according to a predetermined rule may be included as additional candidate of a current block. As signaled index information is applied to a merge candidate list thus constructed, the positional information of a current block may be restored.

For example, positional information may be restored as a sum of predicted positional information of the positional information and residual positional information. To this end, information indicating that it is not a merge mode may be signaled (for example, MergeFlag=0), and the candidate of a predictor may be the left block and top block of a current block.

Herein, a list may be constructed by using the positional information of a left block and the positional information of a top block, and the predicted positional information of a current block may be derived by applying a signaled index. When two or less pieces of predicted positional information are included in a list, the rounded-off information of predicted positional information that is already included and/or zero positional information may be added to the list.

When luma information and chroma information are partitioned into the same tree structure, the positional information for a chroma block may be derived based on the positional information for a luma block. On the other hand, when luma information and chroma information are partitioned into different tree structures, a chroma block may be partitioned into sub-blocks, each of which has a predetermined size (for example, 4×4), and the positional information of each sub-block may be derived based on the positional information of a luma block at the corresponding position.

Derived positional information may be updated into a predetermined list to be used for deriving the positional information of a next block. Here, the predetermined list may mean the above-described 'a list of candidates, which are used for intra prediction based on the positional information of a previous block'. Here, it may be confirmed whether or not positional information to be added is already included in the list. When the same positional information is included in a list, the corresponding positional information is removed from the list, and the positions of pieces of positional information succeeding the removed positional information are moved, thereby filling the place of the removed positional information. Then, the positional information to be added may be added to the final position of the list. When there is no same positional information in a list, the positional information to be added may be added at the end of the list.

When positional information for a current block is derived, it may be used to generate a prediction block of the current block. A picture to which positional information is to be applied may be a restored current picture. For example, when inter prediction is performed by using a restored current picture as a reference picture and using positional information as a motion vector, a prediction block of a current block may be generated from the restored current picture.

Intra prediction for a chroma signal may be performed by using a restored luma signal of a current block. In addition, when one restored chroma signal Cb of a current block or the residual signal of Cb is used, intra prediction for another chroma signal Cr may be performed.

Intra prediction may be performed by combining one or more prediction methods described above. For example, an intra-prediction block for a current block may be constructed through a weighted sum of a block, which is predicted by using a predetermined non-directional intra-prediction mode, and a block that is predicted by using a predetermined directional intra-prediction mode. Here, a weight may be differently applied according to at least one among an intra-prediction mode of a current block, the size of a block and the position of a sample.

Alternatively, in the case of a chroma block, an intra-prediction block for a chroma block may be constructed through a weighted sum of a block, which is predicted by using a predetermined intra-prediction mode, and a block that is predicted by using a restored signal of a luma block. Here, a predetermined intra-prediction mode may be one of the modes used for deriving an intra-prediction mode of a chroma block. In the case of a chroma block, whether or not a final prediction block is constructed by using a weighted sum of two prediction blocks as described above may be signaled through encoded information.

In the case of a directional mode, based on a directional prediction mode, the reference sample constructed above may be constructed again. For example, when the directional prediction mode is a mode using all the reference samples existing on the left or top, a one-dimensional arrangement may be constructed for the left or top reference samples. Alternatively, a top reference sample may be constructed by moving a left reference sample. A top reference sample may be constructed by using a weighted sum of one or more left reference samples.

Alternatively, different directional intra predictions may be performed in units of a predetermined sample group of a current block. Here, a predetermined sample group unit may be a block, a sub-block, a line or a single sample.

Figure 15:
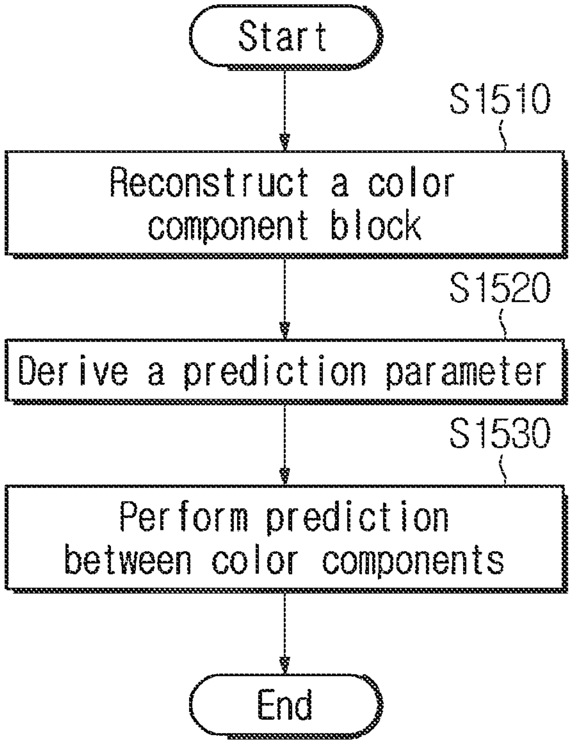
FIG. 15 is a view for explaining a process of performing intra prediction between color components to an embodiment of the present invention.

FIG. 15 is a view for explaining a process of performing intra prediction between color components to an embodiment of the present invention.

According to an embodiment of the present invention, intra prediction between color components may be performed.

Referring to FIG. 15, a process of performing intra prediction between color components may include reconstructing a color component block (S1510), deriving a prediction parameter (S1520) and/or performing prediction between color components (S1530). However, the process may not be limited to those steps.

A color component may mean at least one among a luma signal, a chroma signal, Red, Green, Blue, Y, Cb and Cr. Prediction for a first color component may be performed by using at least one or more among a second color component, a third color component and a fourth color component. Herein, a signal of a color component used for prediction may be at least one among an original signal, a restored signal, a residual signal and a prediction signal.

When intra prediction is performed for a second color component target block, at least one sample among the sample of a corresponding block of a first color component, which corresponds to the second color component target block, and/or the sample of a neighboring block of the corresponding block may be used.

For example, when intra prediction is performed for a chroma component block Cb or Cr, a reconstructed luma component block Y corresponding to the chroma component block may be used.

Alternatively, when intra prediction is performed for a Cr component block, a Cb component block may be used.

Alternatively, when intra prediction is performed for a fourth component block, a combination of at least one or more among a first color component block, a second color component block and/or a third color component block, which correspond to the fourth component block, may be used.

Whether or not intra prediction between color components is possible may be determined based on a coding parameter of a current block. The coding parameter of a current block may include at least one among a slice type comprising the current block, whether or not the current block is dual-tree partitioned block, and the size and shape of the current block.

For example, when the size of a target block is a CTU size, exceeds a predetermined size or is within a predetermined size range, it may be determined that intra prediction between color components can be performed for the target block.

Specifically, when a current block is included in I slice and the luma component and the chroma component of the current block are not dual-tree partitioned block, it may be determined that intra prediction between color components can be performed for the current block. Dual-tree partitioning may mean that the luma component and the chroma component of a current are partitioned according to separate tree structures.

In addition, when the slice type of a target block is not I slice, it may be determined that intra prediction between color components can be performed for the target block. Accordingly, for example, when the slice type of a target block is P slice or B slice, it may be determined that intra prediction between color components can be performed for the target block.

In addition, when the shape of a target block is a predetermined shape, it may be determined that intra prediction between color components can be performed for the target block. Here, if a target block is rectangular, intra prediction between color components may not be performed and the above-described embodiment may be implemented in the opposite way.

When it is determined that intra prediction between color components can be performed for a current block, intra prediction between color components may be performed for the current block. Alternatively, when it is determined that intra prediction between color components can be performed for a current block, information on whether or not intra prediction between color components is applied to the current block may be separately signaled. In this case, based on information on whether or not intra prediction between color components is applicable to a current block, whether or not to apply intra prediction between color components to the current block may be ultimately determined.

Whether or not to perform intra prediction between color components may also be determined based on at least one or more coding parameters among a corresponding block to a prediction target block and a neighboring block of the corresponding block.

For example, when a corresponding block is inter-predicted in the CIP (Constrained Intra Prediction) environment, intra prediction between color components may not be performed.

In addition, when an intra-prediction mode of a corresponding block is a predetermined mode, intra prediction between color components may be performed.

In addition, whether or not to perform intra prediction between color components may be determined based on at least one or more pieces of information among pieces of CBF (Coding Block Flag) information of a corresponding block and a neighboring block. Here, the CBF information may be information showing whether or not there is a residual signal.

The coding parameter is not limited to a prediction mode of a block, and various parameters available for encoding/decoding may be used.

Referring to FIG. 15, in order to perform intra prediction between color components, the step of reconstructing a color component block may be performed (S1510).

When a second color component block is predicted by using a first color component block, the first color component block may be reconstructed.

For example, when the color space of an image is YcbCr and the ratio among color components is one among 4:4:4, 4:2:2 and 4:2:0, the size of a block between color components may be different. Accordingly, when a second color component block is predicted by using a first color component block with a different size, the first color component block may be reconstructed to make the two blocks equal in size. In this case, the reconstructed block may include at least one or more among a sample of a first color component corresponding block and a sample of a neighboring block.

In the above-described step of constructing a reference sample, an indicator (for example, intra_luma_ref_idx) corresponding to a predetermined line among a multiplicity of reference sample lines may be signaled. Here, in the reconstructing step, reconstruction may be performed by using a predetermined line corresponding to the signaled indicator.

For example, when a reference sample line indicator (intra_luma_ref_idx) is '3', reconstruction may be performed by using a fourth reference sample line adjacent to a first color component corresponding block. Here, if reconstruction is performed by using two or more reference sample lines, a third reference sample line may be additionally used.

In addition, when a reference sample line indicator (intra_luma_ref_idx) is '1', reconstruction may be performed by using a second reference sample line adjacent to a first color component corresponding block.

The method of using the indicator in the reconstruction process may be used when a first color component block and a second color component block have the same partition structure.

For example, when both a first color component block and a second color component block in one CTU have the same single tree partition structure, the indicator-based reconstruction process may be performed.

In the reconstruction process, when at least one of the boundary of a second color component target block and the boundary of a first color component block corresponding thereto is the boundary of a predetermined region, a reference sample used for reconstruction may be differently selected. Here, the top and left reference sample lines may be different in number. In addition, the predetermined region may be at least one among picture, slice, tile, CTU and CU.

For example, when the upper boundary of a first color component corresponding block is the boundary of the predetermined region, reconstruction may be performed by using not a top reference sample but only a left reference sample.

In addition, when the left boundary of a first color component corresponding block is the boundary of the predetermined region, reconstruction may be performed by using not a left reference sample but only a top reference sample.

In addition, N top reference sample lines and M left reference sample lines may be used. Here, N may be less than M. For example, when an upper boundary is the boundary of the predetermined region, N may be 1. Alternatively, when a left boundary is the boundary of the predetermined region, M may be 1.

In addition, irrespective of whether or not it is the boundary of the predetermined region, reconstruction may be performed by using N top reference sample lines and/or M left reference sample lines of the first color component corresponding block.

According to an embodiment of the present invention, in order to perform intra prediction between color components, the step of deriving a prediction parameter may be performed (S1520).

A prediction parameter may be derived by using at least one or more among a reference sample of a first color component corresponding block, which is reconstructed in the step S1510, and a reference sample of a second color component prediction target block. Hereinafter, in this specification, a first color component and a first color component block may mean a reconstructed first color component and a reconstructed first color component block respectively.

For example, a prediction parameter may be derived by adaptively using a reference sample of the reconstructed first color component based on an intra-prediction mode of a first color component corresponding block. Herein, a reference sample of a second color component may also be adaptively used based on the intra-prediction mode of the first color component corresponding block.

According to an embodiment of the present invention, in order to perform intra prediction between color components, the step of performing prediction between color components may be performed (S1530).

When a prediction parameter is derived in the step S1520, intra prediction between color components may be performed by using at least one of the derived prediction parameters.

The method of prediction between color components may also be applied to an inter-prediction mode. For example, when inter prediction is performed for a current block, inter prediction may be performed for a first color component, and prediction between color components may be performed for a second color component. For example, the first color component may be a luma component, and the second color component may be a chroma component.

In addition, the prediction between color components may be adaptively performed according to a coding parameter of a first color component.

For example, whether or not to perform the prediction between color components may be determined according to the CBF information of the first color component. Here, the CBF information may be information showing whether or not there is a residual signal.

In other words, when the CBF of the first color component is '1', prediction between color components may be performed for a second color component. On the other hand, when the CBF of the first color component is '0', prediction between color components may not be performed for a second color component, but inter prediction may be performed.

In addition, a flag indicating whether or not prediction between color components is performed may be separately signaled. Here, whether or not prediction between color components is performed may be determined based on a CCLM mode indicator(cclm_mode_flag). For example, when a CCLM mode indicator(cclm_mode_flag) is '1' (or 'true'), it may be determined that prediction between color components is performed for a chroma block. If there is no CCLM mode indicator(cclm_mode_flag) value, it may be determined that no prediction between color components is performed.

When prediction between color components is performed, if an encoding mode of a first color component is an inter-prediction mode, prediction between color components may be performed for a second color component.

For example, when inter prediction is performed for a current block, inter prediction may be performed for a first color component, and prediction between color components may be performed for a second color component. Here, the first color component may be a luma component, and the second color component may be a chroma component.

Prediction between color components may be performed by using a reconstructed sample or a prediction sample of the luma component. For example, after inter prediction for the luma component is performed, prediction for a chroma component may be performed by applying a parameter of prediction between color components for a prediction sample. Here, the prediction sample may mean a sample for which at least one among motion compensation, motion correction, OBMC (Overlapped Block Motion Compensation) and BIO (BI-directional Optical flow) is performed.

The prediction between color components may be adaptively performed according to a coding parameter of a first color component. For example, whether or not to perform the prediction between color components may be determined according to the CBF information of the first color component. The CBF information may be information showing whether or not there is a residual signal.

In other words, when the CBF of the first color component is '1', prediction between color components may be performed for a second color component. On the other hand, when the CBF of the first color component is '0', prediction between color components may not be performed for a second color component, but inter prediction may be performed.

In addition, a flag indicating whether or not the prediction between color components is performed may be signaled. For example, whether or not prediction between color components is performed may be signaled in units of CU or PU. Here, whether or not prediction between color components is performed may be determined based on a CCLM mode indicator (cclm_mode_flag).

When the coding parameter of the first color component satisfies a predetermined condition, a flag indicating whether or not prediction between color components is performed may be signaled.

For example, when the CBF of a first color component is 1, whether or not color component prediction is performed may be determined by signaling a flag indicating whether or not prediction between color components is performed.

When prediction between color components is performed for the second color component, an inter-picture motion prediction or compensation value for the second color component may be used.

For example, inter-picture motion prediction or compensation for a second color component may be performed by using inter prediction information for a first color component, and prediction may be performed through a weighted sum of a value of prediction between color components and an inter-picture motion compensation value for a second color component.

Alternatively, when an inter-prediction mode of a current block is a merge mode, prediction for a second color component of the current block may be performed through a weighted sum of a value, which is predicted by using motion information corresponding to a merge index, and a value that is predicted by performing prediction between color components.

Here, a first color component block used for performing prediction between color components may be at least one of a predicted value from inter prediction (using a merge mode, for example) and a reconstructed value.

In addition, a weight for the weighted sum may be 1:1.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

What is claimed is:

1. A video decoding method, comprising:

deriving a prediction mode of a current block based on a bitstream; and generating a prediction block of the current block by performing prediction based on the prediction mode of the current block, wherein:

the prediction is intra prediction using a DC mode, a reference sample of the intra prediction using the DC mode is constructed using a reference sample line selected from a plurality of reference sample lines, an indicator is used to select the reference sample line from the plurality of reference sample lines, the indicator is obtained from the bitstream, and the intra prediction using the DC mode is performed based on whether the current block is a square block or not.

2. The video decoding method of claim 1, wherein the intra prediction using the DC mode is performed using an upper reference sample of the current block and a left reference sample of the current block in a case that the current block is a square block.

3. The video decoding method of claim 1, wherein the intra prediction using the DC mode is performed using an average value of reference samples which are adjacent to an upper side of the current block in a case that a horizontal length of the current block is greater than a vertical length of the current block.

4. A video encoding method, comprising:

deriving a prediction mode of a current block;

constructing a reference sample of prediction using a reference sample line selected from a plurality of reference sample lines;

generating a prediction block of the current block by performing the prediction based on the prediction mode of the current block; and generating a bitstream comprising information for an indicator which indicates the reference sample line among the plurality of reference sample lines, wherein the prediction is intra prediction using a DC mode, and the intra prediction using the DC mode is performed based on whether the current block is a square block or not.

5. The video encoding method of claim 4, wherein the intra prediction using the DC mode is performed using an upper reference sample of the current block and a left reference sample of the current block in a case that the current block is a square block.

6. The video encoding method of claim 4, wherein the intra prediction using the DC mode is performed using an average value of reference samples which are adjacent to an upper side of the current block in a case that a horizontal length of the current block is greater than a vertical length of the current block.

7. A method of generating and transmitting a bitstream, the method comprising:

generating the bitstream comprising prediction mode information and indicator information generated by a video encoding method; and transmitting the bitstream, wherein the video encoding method comprises:

deriving a prediction mode of a current block;

constructing a reference sample of prediction using a reference sample line selected from a plurality of reference sample lines;

generating a prediction block of the current block by performing the prediction based on the prediction mode of the current block; and generating the prediction mode information and the indicator information, wherein the prediction mode information indicates the prediction mode of the current block, wherein the indicator information indicates the reference sample line among the plurality of reference sample lines, wherein the prediction is intra prediction using a DC mode, and wherein the intra prediction using the DC mode is performed based on whether the current block is a square block or not.

8. The method of claim 7, wherein the intra prediction using the DC mode is performed using an upper reference sample of the current block and a left reference sample of the current block in a case that the current block is a square block.

9. The method of claim 7, wherein the intra prediction using the DC mode is performed using an average value of reference samples which are adjacent to an upper side of the current block in a case that a horizontal length of the current block is greater than a vertical length of the current block.

10. A non-transitory computer-readable recording medium storing program instructions for transmitting a bitstream, the program instructions comprising:

first instructions to generate the bitstream comprising prediction mode information and indicator information; and second instructions to transmit the bitstream, wherein the prediction mode information and the indicator information are generated by a video encoding method, wherein the video encoding method comprises:

deriving a prediction mode of a current block;

constructing a reference sample of prediction using a reference sample line selected from a plurality of reference sample lines;

generating a prediction block of the current block by performing the prediction based on the prediction mode of the current block;

generating the prediction mode information and the indicator information, wherein the prediction mode information indicates intra prediction using a DC mode as the prediction mode, wherein the indicator information indicates the reference sample line among the plurality of reference sample lines, and wherein the intra prediction using the DC mode is performed based on whether the current block is a square block or not.

11. The non-transitory computer-readable recording medium of claim 10, wherein the intra prediction using the DC mode is performed using an upper reference sample of the current block and a left reference sample of the current block in a case that the current block is a square block.

12. The non-transitory computer-readable recording medium of claim 10, wherein the intra prediction using the DC mode is performed using an average value of reference samples which are adjacent to an upper side of the current block in a case that a horizontal length of the current block is greater than a vertical length of the current block.

* * * * *